(12) United States Patent
Kita et al.

(10) Patent No.: US 9,126,178 B2
(45) Date of Patent: Sep. 8, 2015

(54) HEAT-EXPANDABLE MICROSPHERES AND A METHOD OF MAKING HEAT-EXPANDABLE MICROSPHERES AND APPLICATION THEREOF

(75) Inventors: Yu Kita, Yao (JP); Katsushi Miki, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 390 days.

(21) Appl. No.: 13/321,581

(22) PCT Filed: May 21, 2010

(86) PCT No.: PCT/JP2010/058583
§ 371 (c)(1),
(2), (4) Date: Nov. 21, 2011

(87) PCT Pub. No.: WO2010/143512
PCT Pub. Date: Dec. 16, 2010

(65) Prior Publication Data
US 2012/0064347 A1   Mar. 15, 2012

(30) Foreign Application Priority Data

Jun. 9, 2009  (JP) .................. 2009-138522
Aug. 28, 2009  (JP) .................. 2009-197754

(51) Int. Cl.
*B32B 15/02* (2006.01)
*B05D 1/02* (2006.01)
(Continued)

(52) U.S. Cl.
CPC .............. *B01J 13/20* (2013.01); *B01J 13/185* (2013.01); *Y10T 428/2989* (2015.01)

(58) Field of Classification Search
CPC .......... B01J 13/14; B01J 13/185; B01J 13/20; B01J 13/04; B01J 20/28007; B01J 20/28038; B82Y 30/00; B82Y 99/00; C09J 2205/11; C08J 9/32; C08J 2203/22; C08J 2201/024; C08J 2201/026; C08J 9/146; C08J 9/22; C08K 7/22; C08K 9/10; B60C 17/066; B60C 29/062
USPC ......... 428/402–402.24, 403, 404, 407, 321.1, 428/474.4; 427/331, 389.9, 212, 427/213.3–213.36, 483, 256; 264/534, 5, 264/41, 4–4.7; 424/408, 450, 451, 455, 424/93.7, 184.1, 497, 489, 501, 490, 491, 424/492, 493, 494, 495
See application file for complete search history.

(56) References Cited

U.S. PATENT DOCUMENTS 3,615,972 A   10/1971   Morehouse et al.
6,235,394 B1   5/2001   Shimazawa et al.
(Continued)

FOREIGN PATENT DOCUMENTS

EP   0569234 A1   11/1993
EP   1688454 A1   8/2006
(Continued)

OTHER PUBLICATIONS

Japanese Office Action corresponding to JP2010-535137, mailed Nov. 30, 2010.
(Continued)

*Primary Examiner* — James J Seidleck
*Assistant Examiner* — S. Camilla Pourbohloul
(74) *Attorney, Agent, or Firm* — Global IP Counselors, LLP

(57) ABSTRACT

Heat-expandable microspheres having high heat resistance and high solvent resistance, a production process thereof include a shell of a thermoplastic resin and a thermally vaporizable blowing agent being encapsulated therein. The thermoplastic resin includes a copolymer produced by polymerizing a polymerizable component containing a carboxyl-group-containing monomer. The surface of the heat-expandable microspheres is treated with an organic compound containing a metal of the Groups from 3 to 12 in the Periodic Table.

15 Claims, 8 Drawing Sheets

(51) Int. Cl.
*A61K 9/14* (2006.01)
*B01J 13/20* (2006.01)
*B01J 13/18* (2006.01)

(56) References Cited

U.S. PATENT DOCUMENTS

| | | | |
|---|---|---|---|
| 6,984,347 | B2 | 1/2006 | Mausda et al. |
| 2005/0080151 | A1* | 4/2005 | Miki et al. .................. 521/50 |
| 2005/0158390 | A1* | 7/2005 | Rana et al. .................. 424/489 |
| 2006/0063000 | A1* | 3/2006 | Tokumura et al. ......... 428/402.2 |
| 2007/0208093 | A1* | 9/2007 | Nordin et al. ............... 521/56 |
| 2009/0292031 | A1 | 11/2009 | Ejiri |
| 2010/0120929 | A1 | 5/2010 | Naito et al. |
| 2010/0204349 | A1 | 8/2010 | Inohara et al. |

FOREIGN PATENT DOCUMENTS

| | | |
|---|---|---|
| EP | 1947121 A1 | 7/2008 |
| EP | 1952881 A1 | 8/2008 |
| EP | 1953184 A1 | 8/2008 |
| JP | S47-39474 A | 12/1972 |
| JP | H2-1307 | 1/1990 |
| JP | H11-269300 A | 10/1999 |
| JP | 2006-213930 A | 8/2006 |
| WO | WO99/43758 | 9/1999 |
| WO | WO03/099955 A1 | 12/2003 |
| WO | WO2007/072769 A1 | 6/2007 |
| WO | 2008-142849 A1 | 11/2008 |
| WO | WO2009/050863 A1 | 4/2009 |

OTHER PUBLICATIONS

Extended European Search Report of the corresponding European Patent Application No. 10786043.9, dated Feb. 3, 2015.
Extended European Search Report of the corresponding European Application No. 12180221.9, dated Sep. 26, 2014.

\* cited by examiner

US 9,126,178 B2

HEAT-EXPANDABLE MICROSPHERES AND A METHOD OF MAKING HEAT-EXPANDABLE MICROSPHERES AND APPLICATION THEREOF

TECHNICAL FIELD

The present invention relates to heat-expandable microspheres and a method of making heat-expandable microspheres and application thereof. Specifically, it relates to heat-expandable microspheres having high heat resistance and high solvent resistance, a process for producing the same, and application thereof.

TECHNICAL BACKGROUND

Heat-expandable microspheres, which comprise a shell of a thermoplastic resin and a blowing agent encapsulated therein, are generally called heat-expandable microcapsules. The thermoplastic resin usually includes vinylidene chloride copolymers, acrylonitrile copolymers, and acrylic acid ester copolymers. The blowing agent mainly employed includes hydrocarbons, such as isobutane and isopentane. (Refer to Patent Reference 1).

An example of such heat-expandable microcapsules already is disclosed as heat-expandable microspheres comprising a shell of a copolymer produced by polymerizing (I) a nitrile monomer and (II) a carboxyl-group-containing monomer. (Refer to Patent Reference 2). Although the heat-expandable microcapsules have good heat resistance, a higher grade of heat resistance is required to meet the recent demand for better microcapsule properties.

A variant of similar heat-expandable microcapsules comprising a shell of a copolymer produced by polymerizing (I) acrylonitrile, (II) a carboxyl-group-containing monomer and (III) a monomer containing a group reactive to the carboxyl group have been disclosed. (Refer to Patent Reference 3.) The heat-expandable microcapsules have good heat resistance. On the other hand, the carboxyl group and the group reactive to the carboxyl group, which are uniformly distributed in the copolymer, may excessively promote crosslinking when the microcapsules are heated and expanded. The hollow particulates produced by heating and expanding the microcapsules have good solvent resistance owing to the promoted crosslinking in the heating and expanding, while the solvent resistance is required to be improved to higher grade.

Patent Reference 4 describes a variant of heat-expandable microcapsules which comprise a shell of a copolymer having a polymethacrylimide structure produced from methacrylonitrile and methacrylic acid and a blowing agent being encapsulated therein. The heat-expandable microcapsules also have good heat resistance. However, the shell has poor gas-barrier performance and solvent resistance, because the high ratio of methacrylonitrile in the copolymer resin constituting the shell decreases the crystallinity of the copolymer resin. The poor gas-barrier performance remarkably deteriorates the heat resistance and expansion performance of the microcapsules employed in resin molding where the microcapsules are held in a high-temperature environment for a long time.

LITERATURE OF PRIOR ART

Patent References

[Patent Reference 1] U.S. Pat. No. 3,615,972
[Patent Reference 2] WO 03/099955
[Patent Reference 3] WO 99/43758
[Patent Reference 4] WO 2007/072769

DISCLOSURE OF INVENTION

Technical Problem

The object of the present invention is to provide heat-expandable microspheres having high heat and solvent resistance, a process for producing the same and application thereof.

Technical Solution

For solving the problems described above, the inventors of the present invention have studied diligently and have found that the heat-expandable microspheres described in 1) and/or 2) below solve the problem mentioned above, and have achieved the present invention.

1) heat-expandable microspheres produced by treating the surface of base-material microspheres with an organic compound containing a metal of the Groups from 3 to 12 in the Periodic Table, wherein the base-material microspheres comprise a shell of a thermoplastic resin produced by polymerizing a polymerizable component including a carboxyl-group-containing monomer.

2) heat-expandable microspheres comprising a shell of a thermoplastic resin produced by polymerizing a polymerizable component including a carboxyl-group-containing monomer, and resulting in minimum ranges of variation (decrease, in most cases) in their expansion-initiating and maximum expansion temperatures, the variation being caused by their contact with water.

Specifically, heat-expandable microspheres of the present invention comprise a shell of a thermoplastic resin and a thermally vaporizable blowing agent being encapsulated therein. The thermoplastic resin comprises a copolymer produced by polymerizing a polymerizable component including a carboxyl-group-containing monomer, and the surface of the heat-expandable microspheres is treated with an organic compound containing a metal of the Groups from 3 to 12 in the Periodic Table.

The organic compound containing the metal should preferably be a metal-amino acid compound and/or a compound having at least one bond represented by the following chemical formula (1):

$$M\text{—}O\text{—}C \qquad (1)$$

(where "M" is an atom of a metal of the Groups from 3 to 12 in the Periodic Table; and the carbon atom, "C", bonds to the oxygen atom, "O", and also bonds only to a hydrogen atom and/or a carbon atom except the oxygen atom, "O").

The organic compound containing the metal should preferably be soluble in water.

The amount of the metal should preferably range from 0.05 to 15 weight percent of the heat-expandable microspheres.

The metal should preferably belong to the Groups 4 and 5 in the Periodic Table.

The amount of the carboxyl-group-containing monomer should preferably be greater than 50 weight percent of the polymerizable component.

It is preferable that the polymerizable component further comprises a nitrile monomer.

The ranges of the variation in the expansion-initiating temperature and maximum expansion temperature of the heat-expandable microspheres after dispersing 5 parts by weight of the microspheres in 100 parts by weight of deionized water should preferably be not greater than 10 percent of the temperatures before the dispersion.

An alternative type of the heat-expandable microspheres of the present invention comprises a shell of a thermoplastic resin and a thermally vaporizable blowing agent being encapsulated therein, and the thermoplastic resin comprises a copolymer produced by polymerizing a polymerizable component including a carboxyl-group-containing monomer. The maximum expansion ratio of the heat-expandable microspheres is at least 30 times. The ranges of the variation in the expansion-initiating temperature and maximum expansion temperature of the heat-expandable microspheres after dispersing 5 parts by weight of the microspheres in 100 parts by weight of deionized water should preferably be not greater than 10 percent of the temperatures before the dispersion.

Those heat-expandable microspheres should preferably meet at least one of the following requirements (1) to (4).

(1) The blowing agent comprises a hydrocarbon having a boiling point at least −20 deg.C. and lower than 170 deg.C. and a hydrocarbon having a boiling point ranging from 170 deg.C. to 360deg.C.

(2) The ratio of DMF-insoluble matter (dimethylformamide) contained in the heat-expandable microspheres is at least 75 weight percent.

(3) The maximum expansion temperature and maximum expansion ratio of the heat-expandable microspheres are at least 240 deg.C. and at least 30 times, respectively.

(4) The heat-expandable microspheres are wet with a liquid.

The process for producing the heat-expandable microspheres of the present invention comprises the step of treating the surface of base-material microspheres with an organic compound containing a metal of the Groups from 3 to 12 in the Periodic Table, wherein the base-material microspheres comprise a shell of a thermoplastic resin produced by polymerizing a polymerizable component including a carboxyl-group-containing monomer, and a thermally vaporizable blowing agent being encapsulated therein.

The surface treatment should preferably be carried out by mixing the base-material microspheres and the metal-containing organic compound in an aqueous dispersion medium.

Further, the process should preferably comprise, prior to the surface-treatment step, a step of producing the base-material microspheres by polymerizing the polymerizable component in an aqueous dispersion medium in which an oily mixture containing the polymerizable component and a blowing agent are dispersed. The surface treatment should preferably be carried out in the liquid after the polymerization in which the base-material microspheres are contained.

The surface treatment should preferably be carried out by spraying a liquid comprising the metal-containing organic compound to the base-material microspheres.

Furthermore, the process should preferably comprise a step of wetting, with a liquid, heat-expandable microspheres produced at the surface treatment step.

The hollow particulates of the present invention are produced by heating and expanding the heat-expandable microspheres mentioned above and/or the heat-expandable microspheres produced in the process mentioned above.

The composition of the present invention contains at least one particulate material selected from the group consisting of the heat-expandable microspheres mentioned above, the heat-expandable microspheres produced in the process mentioned above and the hollow particulates mentioned above, and a base component.

The formed product of the present invention is produced by the method of producing the composition mentioned above.

Advantageous Effects

The heat-expandable microspheres of the present invention have high solvent resistance and high heat resistance.

The process for producing the heat-expandable microspheres of the present invention can efficiently produce heat-expandable microspheres of good solvent resistance and good heat resistance.

The hollow particulates of the present invention, which are produced from the heat-expandable microspheres, have good solvent resistance and good heat resistance.

The compositions of the present invention, which contain the heat-expandable microspheres and/or hollow particulates, have good solvent resistance and good heat resistance.

The formed products of the present invention, which are produced by the method of producing the compositions mentioned above, are lightweight and have good solvent resistance.

BEST MODE FOR CARRYING OUT THE INVENTION

[Process for Producing Heat-Expandable Microspheres]

Figure 1:
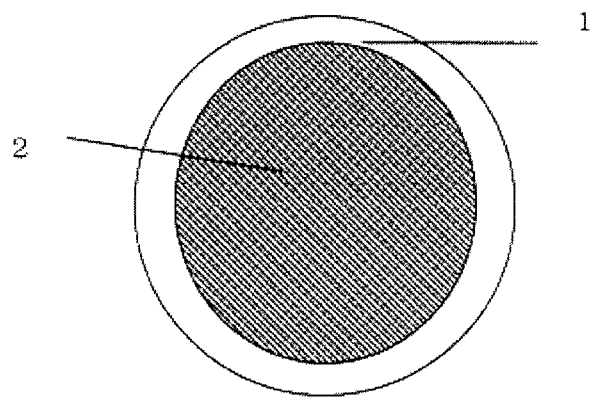
[FIG. 1] is a schematic diagram illustrating an example of base-material microspheres or heat-expandable microspheres

The process for producing the heat-expandable microspheres of the present invention includes a step of treating the surface of base-material microspheres with an organic compound containing a metal of the Groups from 3 to 12 in the Periodic Table (surface treatment step). The "organic compound containing a metal of the Groups from 3 to 12 in the Periodic Table" is hereinafter sometimes referred to as "a metal-containing organic compound".

Further, the process for producing the heat-expandable microspheres of the present invention should preferably include a step of producing the base-material microspheres (base-material microspheres producing step). In addition, the process for producing the heat-expandable microspheres of the present invention should preferably include a step in which heat-expandable microspheres, after the surface-treatment step, are wetted with liquid (a wetting step).

The surface treatment step is described below in detail following to the description of the base-material microspheres and their producing step, and finally the wetting step is described.

(Base-Material Microspheres and their Producing Step)

The base-material microspheres include 1) a shell of a thermoplastic resin and 2) a thermally vaporizable blowing agent being encapsulated therein. The thermoplastic resin is produced by polymerizing a polymerizable component which essentially includes a carboxyl-group-containing monomer (i.e., a polymerizable component containing a carboxyl-group-containing monomer).

At the producing step for base-material microspheres, the polymerizable component is polymerized in an aqueous dispersion medium in which an oily mixture including the polymerizable component and a blowing agent is dispersed.

The blowing agent is not specifically restricted, except that it is a thermally vaporizable substance; and includes, for example, $C_3$-$C_{13}$ hydrocarbons such as propane, (iso)butane, (iso)pentane, (iso)hexane, (iso)heptane, (iso)octane, (iso)nonane, (iso)decane, (iso)undecane, (iso)dodecane and (iso)tridecane; hydrocarbons having a carbon number greater than 13 and not greater than 20, such as (iso)hexadecane and (iso)eicosane; hydrocarbons from petroleum fractions such as pseudocumene, petroleum ether, and normal paraffins and isoparaffins having an initial boiling point ranging from 150 to 260 deg. C. and/or being distilled at a temperature ranging from 70 to 360 deg. C.; their halides; fluorine-containing compounds, such as hydrofluoroether; tetraalkyl silane; and compounds which thermally decompose to generate gases. One of or a combination of at least two of those blowing agents can be employed. The blowing agents can be any of linear-chain, branched-chain or alicyclic compounds, and should preferably be aliphatic hydrocarbons.

The blowing agent is thermally vaporizable. A blowing agent encapsulated in heat-expandable microspheres should preferably have a boiling point not higher than the softening point of the thermoplastic resin shell of the microspheres, because such agent can generate vapor to a pressure sufficient to expand the heat-expandable microspheres at their expanding temperature and attain high expansion ratio. In addition, another blowing agent having a boiling point higher than the softening point of the thermoplastic resin shell can be encapsulated along with the blowing agent having a boiling point not higher than the softening point of the thermoplastic resin shell.

If a substance having a boiling point higher than the softening point of the thermoplastic resin shell is encapsulated in microspheres as a blowing agent, the ratio of such a substance in the whole of the blowing agent encapsulated in the microspheres is not specifically restricted, but should preferably be not greater than 95 weight percent, more preferably not greater than 80 weight percent, further preferably not greater than 70 weight percent, further more preferably not greater than 65 weight percent, still further more preferably not greater than 50 weight percent, and most preferably smaller than 30 weight percent. If the ratio of a substance having a boiling point higher than the softening point of the thermoplastic resin shell exceeds 95 weight percent of the whole of a blowing agent encapsulated in microspheres, the expansion ratio of the microspheres will decrease while their maximum expansion temperature will increase.

There is another alternative for the blowing agent, that is, a blowing agent including a low-boiling-point hydrocarbon (A) and a high-boiling-point hydrocarbon (B). This alternative agent is preferable because it enables to increase the expansion-initiating temperature of heat-expandable microspheres to 220 deg. C. or higher temperature without decreasing the expanding ratio of the microspheres. One of or both of the low-boiling point hydrocarbon (A) and high-boiling point hydrocarbon (B) can be a mixture of hydrocarbons.

The weight ratio of the low-boiling point hydrocarbon (A) to the high-boiling point hydrocarbon (B), (A:B), is not specifically restricted, and should preferably range from 90:10 to 5:95, more preferably from 80:20 to 10:90, further more preferably from 70:30 to 15:85, and most preferably from 65:35 to 20:80. A weight ratio greater than 90:10, may fail to attain sufficiently a high expansion-initiating temperature of the microspheres. A weight ratio smaller than 5:95, may decrease the expansion ratio of the microspheres.

The boiling point of the low-boiling point hydrocarbon (A) is usually at least −20 deg. C. and lower than 170 deg. C., and should preferably range from 25 to 140 deg. C., more preferably from 50 to 130 deg. C., and most preferably from 55 to 110 deg. C.

The low-boiling point hydrocarbons (A) include, for example, $C_4$-$C_9$ hydrocarbons such as, isobutane, cyclobutane, pentane, isopentane, cyclopentane, hexane, isohexane (2-methyl pentane, 3-methyl pentane, 2,2-dimethyl butane, and 2,3-dimethyl butane), cyclohexane, heptane, isoheptane (2,2,3-trimethyl butane, 2,2-dimethyl pentane, 2,3-dimethyl pentane, 2,4-dimethyl pentane, 2-methyl hexane), 3-ethyl pentane, 3-methyl hexane, 1,1,2,2-tetramethyl cyclopropane, octane, isooctane (2,2,3,3-tetramethyl butane, 2,2,3-trimethyl pentane, 2,2,4-trimethyl pentane, 2,2-dimethyl hexane, 2,4-dimethyl hexane, 2,5-dimethyl hexane), nonane, isononane (2,2,4,4-tetramethyl pentane, 2,2,4-trimethyl hexane, 2,2,5-trimethyl hexane, 2,3-dimethyl heptane, 2,4-dimethyl heptane, 2,5-dimethyl heptane, 2-methyl octane), 3,3-dimethyl heptane, 3,4-dimethyl heptane, 3,5-dimethyl heptane, 1,1,3-trimethyl cyclohexane, 1,1,4-trimethyl cyclohexane, 1,2,3-trimethyl cyclohexane, 1,2,4-trimethyl cyclohexane, 1,3,5-trimethyl cyclohexane, and 1-ethyl-2-methyl cyclohexane. Those hydrocarbons can be any of linear-chain, branched-chain or alicyclic compounds, and should preferably be aliphatic hydrocarbons. The low-boiling-point hydrocarbon (A) can include petroleum fractions such as normal paraffins and isoparaffins distilled at a temperature ranging from 70 to 170 deg. C., not including 170 deg. C.

Of those low-boiling-point hydrocarbons (A), hydrocarbons having a boiling point ranging from 55 to 110 deg. C. (for example, isohexane and isooctane) are preferable. The ratio of the hydrocarbons having a boiling point ranging from 55 to 110 deg. C. in the low-boiling point hydrocarbon (A) is not specifically restricted, but should preferably range from 50 to 100 weight percent, more preferably from 70 to 100 weight percent, and most preferably from 90 to 100 weight percent. A ratio lower than 50 weight percent may result in insufficiently high expansion-initiating temperature of microspheres.

The boiling point of the high-boiling-point hydrocarbon (B) usually ranges from 170 to 360 deg. C. and should preferably range from 185 to 300 deg. C., more preferably from 200 to 270 deg. C., and most preferably from 210 to 265 deg. C.

The high-boiling-point hydrocarbons (B) include, for example, $C_{10}$-$C_{20}$ hydrocarbons, such as decane, isobutyl cyclohexane, butyl cyclohexane, cyclodecane, normal pentyl cyclopentane, tert-butyl cyclohexane, trans-1-isopropyl-4-methyl cyclohexane, undecane, amyl cyclohexane, dodecane, isododecane (2,2,4,6,6-pentamethyl heptane and 2-methyl undecane), 3-methyl undecane, cyclododecane, hexyl cyclohexane, tridecane, 4-methyl dodecane, pentyl cyclohexane, tetradecane, normal octyl cyclohexane, pentadecane, nonyl cyclohexane, hexadecane, isohexadecane (2,2,4,4,6,8,8-heptamethyl nonanehexadecane), decyl cyclohexane, heptadecane, 2,6,10,14-tetramethyl pentadecane, and isoeicosane. Those hydrocarbons can be any of linear-chain, branched-chain or alicyclic compounds, and should preferably be aliphatic hydrocarbons. The high-boiling point hydrocarbon (B) can include petroleum fractions, such as normal paraffins and isoparaffins, having a distillation range from 170 deg. C. to 360 deg. C.

Of those high-boiling point hydrocarbons (B), hydrocarbons having a boiling point ranging from 210 to 265 deg. C. (for example, isohexadecane) are preferable. The ratio of the hydrocarbons having a boiling point ranging from 210 to 265 deg. C. in the high-boiling point hydrocarbon (B) is not specifically restricted, but should preferably range from 50 to 100 weight percent, more preferably from 70 to 100 weight percent, and most preferably from 90 to 100 weight percent. A ratio lower than 50 weight percent may result in insufficiently high expansion ratio of microspheres.

The polymerizable component is polymerized (preferably in the presence of a polymerization initiator) to form the shell of heat-expandable microspheres (base-material microspheres). The polymerizable component essentially includes a monomer component and optionally contains a cross-linking agent.

The monomer component usually includes a component referred to as a (radically) polymerizable monomer having one polymerizable double bond. The monomer component essentially includes a carboxyl-group-containing monomer.

The carboxyl-group-containing monomer is not specifically restricted, except that it contains at least one free carboxyl group per one molecule, and the monomer includes unsaturated monocarboxylic acids, such as acrylic acid, methacrylic acid, ethacrylic acid, crotonic acid and cinnamic acid; unsaturated dicarboxylic acids, such as maleic acid, itaconic acid, fumaric acid, citraconic acid and chloromaleic acid; anhydrides of unsaturated dicarboxylic acids; and monoesters of unsaturated dicarboxylic acids, such as monomethyl maleate, monoethyl maleate, monobutyl maleate, monomethyl fumarate, monoethyl fumarate, monomethyl itaconate, monoethyl itaconate and monobutyl itaconate. One of or a combination of at least two of those carboxyl-group-containing monomers can be employed. Part or whole of the carboxyl groups contained in the carboxyl-group-containing monomers can be neutralized in or after the polymerization. Of those carboxyl-group-containing monomers, acrylic acid, methacrylic acid, maleic acid, maleic acid anhydride and itaconic acid are preferable, acrylic acid and methacrylic acid are more preferable, and methacrylic acid is most preferable for high gas-barrier performance of resultant microspheres.

The monomer component essentially includes a carboxyl-group-containing monomer and can optionally include at least one of other monomers. Other monomers are not specifically restricted, and include, for example, nitrile monomers such as acrylonitrile, methacrylonitrile and fumaronitrile; halogenated vinyl monomers, such as vinyl chloride; halogenated vinylidene monomers, such as vinylidene chloride; vinyl ester monomers, such as vinyl acetate, vinyl propionate, and vinyl butyrate; (meth)acrylic acid ester monomers, such as methyl(meth)acrylate, ethyl(meth)acrylate, n-butyl(meth)acrylate, t-butyl (meth)acrylate, 2-ethylhexyl (meth)acrylate, stearyl(meth)acrylate, phenyl(meth)acrylate, isobornyl(meth)acrylate, cyclohexyl(meth)acrylate, benzyl (meth)acrylate and 2-hydroxyethyl(meth)acrylate; (meth) acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinylnaphthalene salts. The term, (meth)acryl, means acryl or methacryl.

The monomer component should preferably include at least one monomer selected from the group consisting of nitrile monomers, (meth)acrylic acid ester monomers, styrene monomers, vinyl ester monomers, acrylamide monomers and halogenated vinylidene monomers, in addition to a carboxyl-group-containing monomer.

The amount of the carboxyl-group-containing monomer in the monomer component should preferably range from 10 to 90 weight percent, more preferably from 30 to 90 weight percent, further preferably from 40 to 90 weight percent, further more preferably from above 51.2 weight percent to 90 weight percent, and most preferably from 53 to 90 weight percent, in order to upgrade the heat resistance and solvent resistance of the resultant heat-expandable microspheres and extending their working temperature range and working life. An amount of the carboxyl-group-containing monomer lower than 10 weight percent may fail to attain sufficient heat resistance of resultant microspheres and consequently fail to attain stable expansion performance of resultant microspheres in high temperature range over a long time. An amount of the carboxyl-group-containing monomer higher than 90 weight percent may degrade the expansion performance of microspheres.

A monomer component further including a nitrile monomer is preferable for improving the gas-barrier performance of the thermoplastic resin shell of microspheres.

In a monomer component essentially including a nitrile monomer, the ratio of the mixture of a carboxyl-group-containing monomer and nitrile monomer in the monomer component should preferably be at least 50 weight percent, more preferably at least 60 weight percent, further preferably at least 70 weight percent, further more preferably at least 80 weight percent, and most preferably at least 90 weight percent.

In this case, the ratio of the carboxyl-group-containing monomer in the mixture of the carboxyl-group-containing monomer and nitrile monomer should preferably range from 10 to 90 weight percent, more preferably from 30 to 90 weight percent, further preferably from 40 to 90 weight percent, further more preferably from above 51.2 weight percent to 90 weight percent, and most preferably from 53 to 90 weight percent. An amount of the carboxyl-group-containing monomer lower than 10 weight percent may fail to impart sufficient heat resistance and solvent resistance to resultant microspheres and consequently fail to attain stable expansion performance of the resultant heat-expandable microspheres in high temperature range over a long time. An amount of the carboxyl-group-containing monomer higher than 90 weight percent may degrade the expansion performance of resultant heat-expandable microspheres.

A monomer component including a vinylidene chloride monomer improves the gas-barrier performance of the resultant thermoplastic resin shell. A monomer component including a (meth)acrylic acid ester monomer and/or styrene monomer makes the thermal expansion performance of microspheres readily controllable. A monomer component including a (meth)acrylamide monomer improves the heat resistance of resultant microspheres.

The ratio of at least one monomer selected from the group consisting of vinylidene chloride, (meth)acrylic acid ester monomer, (meth)acrylamide monomer and styrene monomer in the monomer component should preferably be less than 50 weight percent, more preferably less than 30 weight percent, and most preferably less than 10 weight percent. If the ratio of the monomer is equal to or greater than 50 weight percent, the heat resistance of resultant microspheres may be degraded.

The monomer component can include a monomer reactive to the carboxyl group in a carboxyl-group-containing monomer. A monomer component including a monomer reactive to the carboxyl group further upgrades the heat resistance of the resultant microspheres and improves their expansion performance at high temperature. The monomers reactive to the carboxyl group include, for example, N-methylol (meth)acrylamide, N,N-dimethylaminoethyl(meth)acrylate, N,N-dimethylaminopropyl(meth)acrylate, vinyl glycidyl ether, propenyl glycidyl ether, glycidyl(meth)acrylate, 2-hydroxyethyl(meth)acrylate, 2-hydroxypropyl(meth)acrylate, 2-hydroxybutyl(meth)acrylate, and 2-hydroxy-3-phenoxypropyl(meth)acrylate. The ratio of the monomer reactive to the carboxyl group should preferably range from 0.1 to 10 weight percent, and more preferably from 3 to 5 weight percent of the monomer component.

The polymerizable component can include, in addition to the monomers mentioned above, a polymerizable monomer (cross-linking agent) having at least two polymerizable double bonds. A shell of a thermoplastic resin polymerized with a cross-linking agent minimizes the loss in the retention (retention in microspheres) of a blowing agent in thermally expanded microspheres so as to achieve sufficient thermal expansion of the microspheres.

The cross-linking agent is not specifically restricted, and includes, for example, aromatic divinyl compounds, such as divinyl benzene; and di(meth)acrylate compounds, such as allyl methacrylate, triacrylformal, triallyl isocyanate, ethylene glycol di(meth)acrylate, diethylene glycol di(meth)acrylate, 1,4-butanediol di(meth)acrylate, 1,9-nonanediol di(meth)acrylate, PEG (200) di(meth)acrylate, PEG (600) di(meth)acrylate, trimethylolpropane trimethacrylate, pentaerythritol tri(meth)acrylate, dipentaerythritol hexaacrylate, and 2-butyl-2-ethyl-1,3-propanediol diacrylate. One of or a combination of at least two of those cross-linking agents can be used.

The amount of the cross-linking agent is not specifically restricted but should preferably range from 0.01 to 5 parts by weight, more preferably from 0.1 to 1 parts by weight, and most preferably from over 0.2 to less than 1 parts by weight to 100 parts by weight of a monomer component. The amount may be less than 0.1 parts by weight to 100 parts by weight of a monomer component, because a highly cross-linked resin layer can be formed at the outermost layer of resultant heat-expandable microspheres through the treatment on the external surface of base-material microspheres at the surface-treatment step mentioned below. The highly cross-linked resin layer provides the microspheres of gas-barrier performance, which prevents a blowing agent from permeating through the thermoplastic resin shell to go out of the microspheres when the blowing agent is heated and evaporated. Consequently, heat-expandable microspheres produced with a cross-linking agent in an amount less than 0.1 parts by weight still retains good expansion performance.

The amount of the carboxyl-group-containing monomer in the polymerizable component should preferably be at least 10 weight percent, more preferably at least 30 weight percent, further preferably at least 40 weight percent, further more preferably greater than 50 weight percent, and most preferably at least 53 weight percent, for the purpose of upgrading the heat resistance and solvent resistance of the resultant heat-expandable microspheres and extending their working temperature range and working life. An amount of the carboxyl-group-containing monomer less than 10 weight percent may fail to attain sufficient heat resistance and solvent resistance of resultant microspheres and consequently fail to attain stable expansion performance of the resultant microspheres in high temperature range over a long time. An amount of the carboxyl-group-containing monomer higher than 90 weight percent may degrade the expansion performance of resultant microspheres.

At the producing step for base-material microspheres, it is preferable to employ an oily mixture containing a polymerization initiator to polymerize the polymerizable component in the presence of the polymerization initiator.

The polymerization initiator is not specifically restricted, and includes, for example, peroxides and azo compounds.

The peroxides include, for example, peroxydicarbonates such as diisopropyl peroxydicarbonate, di-sec-butyl peroxydicarbonate, di-2-ethylhexyl peroxydicarbonate, di-2-octyl peroxydicarbonate and dibenzyl peroxydicarbonate; peroxyesters, such as t-butyl peroxypivalate, t-hexyl peroxypivalate, 1-cyclohexyl-1-methylethyl peroxyneodecanoate, and t-butyl peroxy-3,5,5-trimethylhexanoate; and diacyl peroxides, such as lauroyl peroxide and benzoyl peroxide.

The azo compounds include, for example, 2,2'-azobis(4-methoxy-2,4-dimethyl valeronitrile), 2,2'-azobis isobutylonitrile, 2,2'-azobis(2,4-dimethyl valeronitrile), 2,2'-azobis(2-methyl propionate) and 2,2'-azobis(2-methyl butyronitrile). One of or a combination of at least two of the polymerization initiators can be employed. The polymerization initiator should preferably be an oil-soluble polymerization initiator which is soluble in the monomer component. Of those polymerization initiators mentioned above, peroxydicarbonates are preferable. In a polymerization initiator including a peroxidicarbonate and other polymerization initiators, the peroxidicarbonate should preferably e constitute at least 60 weight percent.

The amount of the polymerization initiator in the monomer component is not specifically restricted but should preferably range from 0.3 to 8.0 parts by weight to 100 parts by weight of the monomer component.

At the producing step of the base-material microspheres, the oily mixture can further include a chain transfer agent.

The aqueous dispersion medium mainly includes water, such as deionized water, for dispersing an oily mixture, and can further include alcohols such as methanol, ethanol and propanol, and hydrophilic organic solvents such as acetone. In the present invention, the term, "hydrophilic", refers to a state of a chemical being miscible in water to a prescribed amount. The amount of the aqueous dispersion medium is not specifically restricted, but should preferably range from 100 to 1,000 parts by weight to 100 parts by weight of a polymerizable component.

The aqueous dispersion medium can further include an electrolyte, such as sodium chloride, magnesium chloride, sodium sulfate, magnesium sulfate, ammonium sulfate and sodium carbonate. One of or a combination of at least two of those electrolytes can be employed. The amount of the electrolyte is not specifically restricted but should preferably range from 0.1 to 50 parts by weight to 100 parts by weight of the aqueous dispersion medium.

The aqueous dispersion medium can include at least one water-soluble compound selected from the group consisting of water-soluble 1,1-substituted compounds having a structure in which a hetero atom and a hydrophilic functional group selected from the group consisting of hydroxyl group, carboxylic acid (salt) groups and phosphonic acid (salt) groups are bonded to the same carbon atom; potassium dichromate; alkali metal nitrites; metal (trivalent) halides; boric acid; water-soluble ascorbic acids; water-soluble polyphenols; water-soluble vitamin Bs; and water-soluble phosphonic acids (salts). In the present invention, the term, "water-soluble" means that at least 1 g of a substance is soluble in 100 g of water.

The amount of the water-soluble compound in the aqueous dispersion medium is not specifically restricted but should preferably range from 0.0001 to 1.0 parts by weight, more preferably from 0.0003 to 0.1 parts by weight, and most preferably from 0.001 to 0.05 parts by weight to 100 parts by weight of a polymerizable component. An insufficient amount of the water-soluble compound may fail to attain the effect by the water-soluble compound. On the other hand, an excessive amount of the water-soluble compound may decrease polymerization rate or increase the amount of polymerizable component which remains unpolymerized after polymerization.

The aqueous dispersion medium can include a dispersion stabilizer or dispersion-stabilizing auxiliary in addition to the electrolyte and water-soluble compound.

The dispersion stabilizer is not specifically restricted, and include, for example, tribasic calcium phosphate; pyrophosphates produced by metathesis reaction such as magnesium pyrophosphate and calcium pyrophosphate; colloidal silica; and alumina sol. One of or a combination of those dispersion stabilizers can be employed.

The amount of the dispersion stabilizer should preferably range from 0.1 to 20 parts by weight, and more preferably from 0.5 to 10 parts by weight to 100 parts by weight of a polymerizable component.

The dispersion-stabilizing auxiliary is not specifically restricted, and includes, for example, polymer-type dispersion-stabilizing auxiliaries; and surfactants, such as cationic surfactants, anionic surfactants, amphoteric surfactants and nonionic surfactants. One of or a combination of at least two of those dispersion-stabilizing auxiliaries can be employed.

The aqueous dispersion medium is prepared, for example, by blending the water-soluble compound and optionally a dispersion stabilizer and/or dispersion stabilizing auxiliary in water (deionized water). The pH of the aqueous dispersion medium in polymerization is determined according to the variants of the water-soluble compound, dispersion stabilizer and dispersion stabilizing auxiliary.

At the producing step of base-material microspheres, the polymerization can be carried out in the presence of sodium hydroxide or the presence of sodium hydroxide and zinc chloride.

At the producing step for base-material microspheres, an oily mixture is dispersed and emulsified in an aqueous dispersion medium to form oil globules of prescribed diameter.

The methods for dispersing and emulsifying the oily mixture include generally known dispersion techniques, such as agitation with a Homo-mixer (for example, those produced by Tokushu Kika Kogyou), dispersion with a static dispersing apparatus such as a Static mixer (for example, those produced by Noritake Engineering Co., Ltd.), membrane emulsification technique, and ultrasonic dispersion.

Then suspension polymerization is initiated by heating the dispersion in which the oily mixture is dispersed into oil globules in the aqueous dispersion medium. During the polymerization reaction, it is preferable to gently agitate the dispersion to a degree which prevents the floating of monomers and sedimentation of polymerized heat-expandable microspheres.

The polymerization temperature can be freely settled according to the variant of a polymerization initiator, and should preferably be controlled within the range from 30 to 100 deg. C., and more preferably from 40 to 90 deg. C. The polymerization temperature should preferably be maintained for about 0.1 to 20 hours. The initial pressure for the polymerization is not specifically restricted, but should preferably be controlled within the range from 0 to 5.0 MPa, more preferably from 0.1 to 3.0 MPa in gauge pressure.

The base-material microspheres should preferably be produced without the presence of the metal-containing organic compounds which are described below in detail.

Although the base-material microspheres should preferably be produced at the step of producing base-material microspheres mentioned above, the producing technique is not specifically restricted.

The base-material microspheres have an average particle size and coefficient of variation (CV) in particle size distribution which are in similar ranges to those of heat-expandable microspheres mentioned below. However, the true specific gravity, retention ratio of an encapsulated blowing agent, working temperature range, working life, maximum expansion temperature and ratio of DMF-insoluble matter of the base-material microspheres before the surface treatment are sometimes different from those of heat-expandable microspheres after the surface treatment, as mentioned below. Especially, the working temperature range, working life, maximum expansion temperature and ratio of DMF-insoluble matter of the base-material microspheres can be greatly different from those of the heat-expandable microspheres.

(Surface Treatment Step)

At the surface treatment step, the surface of base-material microspheres is treated with a metal-containing organic compound. The metal-containing organic compound is not specifically restricted, but should preferably be water-soluble for high surface treatment efficiency.

The metals contained in the metal-containing organic compound are not specifically restricted except that they belong to the Groups from 3 to 12 in the Periodic Table. The metals include, for example, the Group 3 metals such as scandium, ytterbium and cerium; the Group 4 metals, such as titanium, zirconium and hafnium; the Group 5 metals, such as vanadium, niobium and tantalum; the Group 6 metals, such as chromium, molybdenum and tungsten; the Group 7 metals, such as manganese and rhenium; the Group 8 metals such as iron, ruthenium and osmium; the Group 9 metals, such as cobalt and rhodium; the Group 10 metals, such as nickel and palladium; the Group 11 metals such as cupper, silver and gold; and the Group 12 metals, such as zinc and cadmium. One of or a combination of at least two of the metals can be employed. The classification of the metals described above is based on the "Periodic Table of Elements (2005)©, Atomic Weight Sub-Committee of The Chemical Society of Japan, 2006", which was bound at the end of "Kagaku-to Kyoiku (Chemistry and Education) vol. 54, No. 4, 2006".

Of those metals, transition metals (metals of the Groups from 3 to 11) are preferable, and the metals of the Groups 4 and 5 are more preferable.

The transition metals include, for example, scandium, ytterbium, cerium, titanium, zirconium, hafnium, vanadium, niobium, tantalum, chromium, molybdenum, tungsten, manganese, rhenium, iron, ruthenium, osmium, cobalt, rhodium, nickel, palladium, cupper, silver and gold. Of those metals, the transition metals of the Groups 4 and 5 in the Periodic Table, such as scandium, ytterbium, titanium, zirconium, vanadium, niobium, chromium, molybdenum, manganese, iron, ruthenium, cobalt, rhodium, nickel, palladium, cupper and silver are preferable, and titanium, zirconium and vanadium are more preferable for upgrading the heat resistance of resultant microspheres. Metals other than the transition metals may fail to sufficiently upgrade the heat resistance of resultant microspheres.

The valence of the metals mentioned above is not specifically restricted, and should preferably range from 2 to 5, more preferably from 3 to 5, and most preferably from 4 to 5, for the cross-linking efficiency per one metal atom. A metal atom having a valence of 1 may deteriorate the solvent resistance and water resistance of resultant heat-expandable microspheres while a metal atom having a valence of 6 or more may decrease the cross-linking efficiency.

Metals and their valence preferable for constituting the metal-containing organic compound are zinc (valence of 2), cadmium (valence of 2), aluminium (valence of 3), vanadium (valence of 3), ytterbium (valence of 3), titanium (valence of 4), zirconium (valence of 4), lead (valence of 4), cerium (valence of 4), vanadium (valence of 5), niobium (valence of 5) and tantalum (valence of 5) because of improved heat resistance of resultant microspheres.

The metal-containing organic compound should preferably be a metal-amino acid compound and/or a compound having at least one bond represented by the following chemical formula (1);

M—O—C (1)

(where "M" is an atom of a metal of the Groups from 3 to 12 in the Periodic Table; and the carbon atom, "C", bonds to the oxygen atom, "O", and also bonds only to a hydrogen atom and/or carbon atom other than the oxygen atom "O").

At first, the compound having at least one bond represented by the chemical formula (1) is described in detail.

The compound having at least one bond represented by the chemical formula (1)

The bond between a metal atom and oxygen atom (M-O bond) illustrated in the chemical formula (1) can be either an ionic bond or covalent bond (including a coordinate bond), and a covalent bond is preferable.

If the compound having at least one bond represented by the chemical formula (1) has a metal-alkoxide bond and/or metal-aryloxide bond, the compound can impart good solvent resistance and expansion performance which is stable in a high and broad temperature range to the resultant heat-expandable microspheres. Hereinafter, the "metal-alkoxide bond and/or metal-aryloxide bond" is sometimes referred to as "MO bond" and the "compound having a metal-alkoxide bond and/or metal-aryloxide bond" is sometimes referred to as "MO compound" for simplifying the description.

The MO compound contains at least one metal-alkoxide bond or metal-aryloxide bond. The MO compound can further contain a metallic bond other than the MO bond, such as metal-O—C=O bond (metal-acylate bond), metal-OCON bond (metal-carbamate bond), metal=O bond (metal-oxy bond) and metal-acetyl-acetonate bond represented by the chemical formula (2) (where each R1 and R2 is an organic group and can be the same or different) shown below. The symbol, M, represents a metal.

[Formula 1]

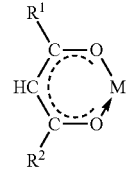

(2)

As clearly mentioned above, the MO bond and metal-O—C=O bond (metal-acylate bond) are different, and the metal-O—C=O bond does not contain the MO bond.

The MO compounds can be classified into four groups of compounds, Compounds (1) to (4), described below.

Compound (1):

The compound (1) includes a metal alkoxide and metal aryloxide represented by the following chemical formula (A).

$M(OR)_n$ (A)

(where "M" represents a metal; "n" is the valence of the metal; "R" is a $C_1$ to $C_{20}$ hydrocarbon group; and each of the hydrocarbon groups existing in the number of "n" can be the same or different, and can be linear-chain, branched-chain or alicyclic group)

The "M" (metal) and "n" (valence) in the compound (1) are those mentioned above.

"R" can be aliphatic or aromatic, and can be saturated or unsaturated. "R" includes, for example, aliphatic hydrocarbon groups, such as methyl group, ethyl group, n-propyl group, isopropyl group, n-butyl group, isobutyl group, tert-butyl group, 2-ethylhexyl group, aryl group, n-decyl group, tridecyl group, stearyl group and cyclopentyl group; and aromatic hydrocarbon groups such as phenyl group, toluoyl group, xylyl group and naphthyl group.

The compound (1) include, for example, zinc (valence of 2) alkoxides, such as zinc diethoxide and zinc diisopropoxide; cadmium (valence of 2) alkoxides such as cadmium dimethoxide and cadmium diethoxide; aluminium (valence of 3) alkoxides, such as aluminium triisopropoxide and aluminium triethoxide; vanadium (valence of 3) alkoxides, such as vanadium triethoxide and vanadium triisopropoxide; ytterbium (valence of 3) alkoxides, such as ytterbium triethoxide and ytterbium triisopropoxide; titanium (valence of 4) alkoxides, such as tetramethoxytitanium, tetraethoxytitanium, tetraisopropoxytitanium, tetranormalpropoxytitanium, tetranormalbutoxytitanium, tetrakis(2-ethylhexyloxy) titanium, and tetraphenoxytitaium; zirconium (valence of 4) alkoxides, such as tetramethoxyzirconium, tetraethoxyzirconium, tetraisopropoxyzirconium, tetranormalpropoxyzirconium, tetranormalbutoxyzirconium, tetrakis(2-ethylhexyloxy)zirconium, and zirconium tetraphenolate; lead (valence of 4) alkoxides, such as tetranormalpropoxylead and tetranormalbutoxylead; cerium (valence of 4) alkoxides, such as tetramethoxycerium, tetraethoxycerium, tetraisopropoxycerium, tetranormalpropoxycerium, tetranormalbutoxycerium, tetrakis(2-ethylhexyloxy)cerium, and cerium tetraphenolate; niobium (valence of 5) alkoxide, such as niobium pentamethoxide, niobium pentaethoxide and niobium pentabutoxide; vanadium (valence of 5) alkoxyoxides, such as trimethoxioxyvanadium, triethoxioxyvanadium, tri(n-propoxy)oxyvanadium, isopropoxioxyvanadium, tri(n-butoxide)oxyvanadium, and isobutoxioxyvanadium; and other metal alkoxides, such as the alkoxides of tantalum, manganese, cobalt and copper.

Compound (2)

The compound (2) includes the oligomer and polymer of the compound (1) mentioned above, and is usually produced in the condensation reaction with the compound (1). The compound (2) is represented by the chemical formula (B) shown below. The chemical formula (B) represents a partially hydrolyzed compound.

(where "M" and "R" represent the same as those in the chemical formula (A); and "x" is an integer at least 2)

The molecular weight of the compound (2) is not specifically restricted, but the number average molecular weight of the compound should preferably range from 200 to 5000, and more preferably from 300 to 3000. A compound having a number average molecular weight less than 200 may result in poor cross-linking efficiency, and a compound having a number average molecular weight greater than 5000 may result in difficult control of the degree of cross-linking.

The compound (2) include, for example, a titanium alkoxide polymer or titanium alkoxide dimer being represented by the chemical formula (B) where "x" ranges from 2 to 15.

The examples of the compound (2) are titanium methoxide polymers, such as hexamethyl dititanate and octamethyl trititanate; titanium ethoxide polymers, such as hexaethyl dititanate and octaethyl trititanate; titanium propoxide polymers, such as hexaisopopyl dititanate, octaisopropyl trititanate, hexanormalpropyl dititanate, and octanormalpropyl trititanate; titanium butoxide polymers, such as hexabutyl dititanate and octabutyl trititanate; titanium phenoxide polymers, such as hexaphenyl dititanate and octaphenyl trititanate; alkoxytitanium-acylate polymers, such as polyhydroxytitanium stearate (i-$C_3H_7$O[Ti(OH)(OCO$C_{17}H_{35}$)O]$_n$-i-$C_3H_7$); and titanium alkoxide dimers, such as titanium methoxide dimer, titanium ethoxide dimer, titanium butoxide dimer and titanium phenoxide dimer Compound (3)

The compound (3) is a metal chelate compound containing the MO bond. The compound (3) is a metal chelate compound containing at least one MO bond in which a ligand moiety containing at least one electron-releasing group selected from the group consisting of hydroxyl group, keto group, carboxyl group and amino group is coordinated to the M. The ligand moiety contains at least one electron-releasing group, and preferably two to four electron-releasing groups. The compound (3) can contain a plurality of the MO bonds, M, and ligand moieties.

The ligand moiety is not specifically restricted, and include, for example, alkanolamines, carboxylic acids, hydroxycarboxylic acids (salts), β-diketones, β-ketoesters, diols and amino acids.

The alkanolamines include, for example, ethanolamine, diethanolamine and triethanolamine.

The carboxylic acids include, for example, acetic acid.

The hydroxycarboxylic acids (salts) include, for example, glycolic acid, lactic acid, malic acid, citric acid, tartaric acid, salicylic acid and their salts.

The β-diketones include, for example, acetylacetone.

The β-ketoesters include, for example, ethyl acetoacetate.

The diols include, for example, ethylene glycol, diethylene glycol, 3-methyl-1,3-butanediol, triethylene glycol, dipropylene glycol, 1,3-propane diol, 1,3-butane diol, 1,5-pentane diol, hexylene glycol and octylene glycol.

The compound (3) containing an alkanolamine as a ligand moiety includes, for example, alkanolamine-alkoxy-titanium chelate compounds, such as titanium tetrakis(diethanol aminate), isopropoxytitanium tris(diethanol aminate), diisopropoxytitanium bis(diethanol aminate), triisopropoxytitanium mono(diethanol aminate), dibutoxytitanium bis(diethanol aminate), titanium tetrakis(triethanol aminate), dimethoxytitanium bis(triethanol aminate), diethoxytitanium bis(triethanol aminate), isopropoxytitanium tris(triethanol aminate), diisopropoxytitanium bis(triethanol aminate), triisopropoxytitanium mono(triethanol aminate), and di-n-butoxytitanium bis(triethanol aminate); alkanolamine-alkoxy-zirconium chelate compounds, such as zirconium tetrakis (diethanol aminate), isopropoxyzirconium tris(diethanol aminate), diisopropoxyzirconium bis(diethanol aminate), triisopropoxyzirconium mono(diethanol aminate), dibutoxyzirconium bis(diethanol aminate), zirconium tetrakis(triethanol aminate), dimethoxyzirconium bis(triethanol aminate), diethoxyzirconium bis(triethanol aminate), isopropoxyzirconium tris(triethanol aminate), diisopropoxyzirconium bis(triethanol aminate), triisopropoxyzirconium mono(triethanol aminate), and di-n-butoxyzirconium bis(triethanol aminate); alkanolamine-alkoxy-cerium chelate compounds, such as cerium tetrakis(diethanol aminate), isopropoxycerium tris (diethanol aminate), diisopropoxycerium bis(diethanol aminate), triisopropoxycerium mono(diethanol aminate), dibutoxycerium bis(diethanol aminate), cerium tetrakis (triethanol aminate), dimethoxycerium bis(triethanol aminate), diethoxycerium bis(triethanol aminate), isopropoxycerium tris(triethanol aminate), diisopropoxycerium bis (triethanol aminate), triisopropoxycerium mono(triethanol aminate), and di-n-butoxycerium bis(triethanol aminate).

The compound (3) containing a hydroxycarboxylic acid (salt) as a ligand moiety includes, for example, hydroxycarboxylic acid (salt)-alkoxytitanium chelate compounds, such as titanium lactate, dihydroxytitanium bis(lactate), dihydroxytitanium bis(lactate) monoammonium salt, dihydroxytitanium bis(lactate)diammonium salt, dihydroxytitanium bis(glycolate), and titanium lactate ammonium salt; hydroxycarboxylic acid (salt)-alkoxy zirconium chelate compounds, such as zirconium lactate, monohydroxyzirconium tris(lactate), dihydroxyzirconium bis(lactate), dihydroxyzirconium bis(lactate) monoammonium salt, dihydroxyzirconium bis(lactate)diammonium salt, dihydroxyzirconium bis(glycolate), and zirconium lactate ammonium salt; hydroxycarboxylic acid (salt)-alkoxy cerium chelate compounds, such as cerium lactate, monohydroxycerium tris(lactate), dihydroxycerium bis(lactate), dihydroxycerium bis(lactate)monoammonium salt, dihydroxycerium bis(lactate) diammonium salt, dihydroxycerium bis(glycolate), and cerium lactate ammonium salt.

The compound (3) containing a β-diketone as a ligand moiety includes, for example, alkoxy zinc-β-diketone chelate compounds, such as zinc acetyl acetonate; β-diketone-alkoxy aluminium chelate compounds, such as aluminium acetyl acetonate; β-diketone-alkoxy vanadium chelate compounds, such as vanadium acetyl acetonate; β-diketone chelate-alkoxy titanium compounds, such as titanium tetrakis(acetyl acetonate), dimethoxytitanium bis(acetyl acetonate), diethoxytitanium bis(acetyl acetonate), diisopropoxytitanium bis(acetyl acetate), dinormalpropoxytitanium bis(acetyl acetonate), dibutoxytitanium bis(acetyl acetonate), titanium tetrakis(2,4-hexane dionate), and titanium tetrakis (3,5-heptane dionate); β-diketone-alkoxy zirconium chelate compounds, such as dihydroxyzirconium bis(acetyl acetonate), zirconium tetrakis(acetyl acetonate), tributoxyzirconium mono(acetyl acetonate), dibutoxyzirconium bis(acetyl acetonate), and monobutoxyzirconium tris(acetyl acetonate); and β-diketone-alkoxy cerium chelate compounds, such as dihydroxycerium bis(acetyl acetonate), cerium tetrakis (acetyl acetonate), tributoxycerium mono(acetyl acetonate), dibutoxycerium bis(acetyl acetonate), and monobutoxycerium tris(acetyl acetonate).

The compound (3) containing a β-ketoester as a ligand moiety includes, for example, β-ketoester-alkoxy titanium chelate compounds, such as diisopropoxytitanium bis(ethyl acetoacetate); and β-ketoester-alkoxy zirconium chelate compounds, such as dibutoxyzirconium bis(ethyl acetoacetate).

The compound (3) containing a β-diketone and β-ketoester as a ligand moiety includes, for example, alkoxytitanium-β-diketone and alkoxytitanium-β-ketoester chelate compounds, such as monobutoxy titanium mono(acetyl acetonate)bis(ethyl acetoacetate); β-diketone- and β-ketoester-alkoxy zirconium chelate compounds, such as monobutoxy zirconium mono(acetyl acetonate)bis(ethyl acetoacetate); and β-diketone- and β-ketoester-alkoxy cerium chelate compounds, such as monobutoxy cerium mono(acetyl acetonate) bis(ethyl acetoacetate).

The compound (3) containing a diol as a ligand moiety includes, for example, alkoxy titanium-diol chelate compounds, such as dioctyloxy titanium bis(octylene glycolate).

The compound (3) can be a metal chelate compound and its derivative, in which a ligand moiety mentioned above is coordinated to a metal atom, such as tantalum, manganese, cobalt and copper.

Compound (4)

The compound (4) contains at least one MO bond and at least one metal-acylate bond. The compound (4) is represented by the following chemical formula (C).

$$M(OCOR^1)_{n-m}(OR)_m \quad (C)$$

(where "M", "n" and "R" are the same as those in the chemical formula (A); "R$^1$" can be the same as or different from R; and m is an integer meeting the expression, $1 \leq m \leq (n-1)$)

The compound (4) can be produced in the condensation reaction of a compound represented by the chemical formula (C).

The compound (4) includes, for example, alkoxy titanium-acylate compounds, such as tributoxy zirconium monostearate; alkoxy zirconium acylate compounds, such as tributoxy zirconium monostearate; and alkoxy cerium acylate compounds, such as tributoxy cerium monostearate.

Metal-Amino Acid Compound

The metal-containing organic compound may be a metal-amino acid compound. The metal-amino acid compound can be produced in the reaction of a salt of a metal of the Groups from 3 to 12 in the Periodic Table and an amino acid described below.

The amino acid includes not only amino acids containing an amino group (—NH$_2$) and carboxyl group (—COOH) in the same molecule, but also imino acids such as proline and hydroxy proline, in which an imino group is contained instead of an amino group. The amino acid is usually α-amino acid, and can be β-, γ-, δ- or ω-amino acid.

The amino acid includes amino acids which are produced by substituting one or two hydrogen atoms of an amino group contained in an amino acid, and amino acid derivatives which are chelate compounds produced by chelating the nitrogen atom of an amino group and the oxygen atom of a carboxyl group contained in an amino acid.

The pH of the amino acid should preferably range from 1 to 7.

The amino acid includes, for example, dihydroxy methyl glycine, dihydroxy ethyl glycine, dihydroxy propyl glycine, dihydroxy butyl glycine, glycine, alanine, valine, leucine, isoleucine, serine, histidine, threonine, glycyl glycine, 1-aminocyclopropane carboxylic acid, 1-aminocyclohexane carboxylic acid, and 2-aminocyclohexane hydrocarboxylic acid. Of those amino acids, dihydroxy ethyl glycine, glycine, serine, threonine, and glycyl glycine are preferable for high cross-linking efficiency.

The preferable salt of a metal of the Groups from 3 to 12 in the Periodic Table to be reacted with the amino acids mentioned above is a basic zirconyl chloride. An example of commercially available metal-amino acid compounds is ORGATIX ZB-126 (produced by Matsumoto Seiyaku Kogyo Co., Ltd.).

Of those metal-containing organic compounds, dioctyloxy titanium bis(octylene glycolate), titanium butoxy dimer, titanium tetrakis(acetyl acetonate), diisopropoxy titanium bis (ethyl acetoacetate), diisopropoxy titanium bis(triethanol aminate), dihydroxy titanium bis(lactate), dihydroxy titanium bis(lactate)monoammonium salt, zirconium tetrakis (acetyl acetonate), dihydroxy titanium bis(lactate)diammonium salt, triisopropoxyoxy vanadium, and a reaction product of zirconium chloride and aminocarboxylic acid (ORGATIX ZB-126) are preferable for the efficiency of improving heat resistance of microspheres and their easy handling.

The molar ratio of the metal-containing organic compound (the mole number of the metal-containing organic compound to the mole number of the carboxyl group-containing monomer which is the raw material of a base-material microsphere) for the surface treatment is not specifically restricted, but should preferably range from 0.001 to 1.0, more preferably from 0.005 to 0.5, further preferably from 0.007 to 0.3, further more preferably from 0.009 to 0.15, and most preferably from 0.009 to 0.06. A molar ratio of the metal-containing organic compound less than 0.001 may fail to sufficiently upgrade the heat resistance of resultant microspheres and may decrease the expansion performance of the microspheres being held at high temperature for a long time. On the other hand, a molar ratio of the metal-containing organic compound greater than 1.0 may make excessively hard shell of resultant heat-expandable microspheres to decrease their expansion performance.

The surface treatment step is not specifically restricted, except that a metal-containing organic compound is brought into contact with base-material microspheres at the step, and the surface treatment should preferably be carried out by mixing base-material microspheres and a metal-containing organic compound with the aqueous dispersion medium mentioned above. Thus, the metal-containing organic compound should preferably be soluble in water.

For carrying out the surface treatment in an aqueous dispersion medium, the amount of base-material microspheres should preferably range from 1 to 50 weight percent, more preferably from 3 to 40 weight percent, and further preferably from 5 to 35 weight percent to a dispersion mixture including the base-material microspheres, a metal-containing organic compound and an aqueous dispersion medium. An amount of the base-material microspheres less than 1 weight percent may degrade the surface treatment efficiency, while an amount over 50 weight percent may cause uneven surface treatment.

The amount of the metal-containing organic compound in the dispersion mixture is not specifically restricted, so far as that the surface of the base-material microspheres can be evenly treated, and should preferably range from 0.1 to 20 weight percent, and more preferably from 0.5 to 15 weight percent. An amount of the metal-containing organic compound less than 0.1 weight percent may degrade the surface treatment efficiency, while an amount over 20 weight percent may cause uneven surface treatment.

The aqueous dispersion medium employed for the surface treatment is usually an aqueous dispersion medium used for producing base-material microspheres or a newly prepared aqueous dispersion medium containing water. The aqueous dispersion medium can optionally contain alcohols, such as methanol, ethanol and propanol; aliphatic hydrocarbons, such as hexane, isooctane and decane; hydroxycarboxylic acids, such as glycolic acid, lactic acid, malic acid, citric acid and salicylic acid, and their salts (for example, lithium salts, sodium salts, potassium salts, ammonium salts and amine salts); ethers, such as tetrahydrofuran, dialkyl ether and diethyl ether; surfactants; antistats; and other components.

At the surface treatment step, heat-expandable microspheres can be produced in the liquid containing the base-material microspheres which were produced at the step of producing the base-material microspheres. Or, heat-expandable microspheres can be produced by treating the surface of base-material microspheres, which have been separated from the liquid after producing the base-material microspheres, by means of filtration, washing with water and optionally drying.

If the aqueous dispersion medium contains other components, the surface of base-material microspheres can be treated with the methods from A) to D) described below.

A) Mixing a component (1) including base-material microspheres and other components, and a component (2) including a metal-containing organic compound B) Mixing a component (1) including a metal-containing organic compound and base-material microspheres, and a component (2) including other components C) Mixing a component (1) including a metal-containing organic compound and other components, and a component (2) including base-material microspheres D) Simultaneously mixing a component (1) including base-material microspheres, a component (2) including other components, and a component (3) including a metal-containing organic compound
(where at least one of the components 1 to 3 mentioned above contains water, and two or three of the components can contain water).

The surface treatment can be carried out with a technique other than those mentioned above, for example, with the techniques 1) and 2) described below.

1) Surface Treatment for Wet Base-Material Microspheres (Base-Material Microspheres in a State of Wet Cake)

Heat-expandable microspheres are produced by preparing a mixture including base-material microspheres, a metal-containing organic compound and an aqueous dispersion medium (in a uniform state), in which the base-material microspheres should preferably constitute at least 50 weight percent, more preferably at least 60 weight percent and further more preferably at least 70 weight percent of the mixture, and by removing the aqueous dispersion medium from the mixture through flash drying or reduced-pressure thermal drying.

2) Surface Treatment for Base-Material Microspheres Almost Dried

Heat-expandable microspheres are produced by adding a metal-containing organic compound to dry base-material microspheres which includes base-material microspheres and an aqueous dispersion medium (in a uniform state) and in which the base-material microspheres should preferably constitute at least 90 weight percent and more preferably at least 95 weight percent of the dry base-material microspheres, then mixing uniformly, and by heating the mixture in order to remove volatiles but not to expand the microspheres. The base-material microspheres can be heated statically, with agitation, or in a fluidized state in the air by means of fluidized bed. The metal-containing organic compound should preferably be added to the dry base-material microspheres by spraying the compound or a liquid containing the compound uniformly onto the microspheres.

The surface-treatment temperature is not specifically restricted, but should preferably range from 30 to 180 deg. C., more preferably from 40 to 150 deg. C., and most preferably from 50 to 120 deg. C. The temperature should preferably be maintained for a period ranging from 0.1 to 20 hours.

The pressure for the surface treatment is not specifically restricted, but should preferably range from 0 to 5.0 MPa, more preferably from 0.1 to 3.0 MPa, and further more preferably from 0.2 to 2.0 MPa in gauge pressure.

At the surface treatment step, heat-expandable microspheres after the surface treatment are usually separated from the aqueous dispersion medium through suction filtration, centrifugal separation or centrifugal filtration. The wet cake of the heat-expandable microspheres after the separation can be processed into dry heat-expandable microspheres through flash drying or thermal drying under reduced pressure. Some of these operations can be omitted optionally in the surface treatment carried out with the technique 1) or 2) mentioned above.

After the surface treatment, the amount of the metal of the Groups from 3 to 12 in the Periodic Table increases in the heat-expandable microspheres. The increase in the amount of the metal of the Groups from 3 to 12 in the Periodic Table which is contained in the surface-treated heat-expandable microspheres is usually at least 10 weight percent, and should preferably be at least 60 weight percent, more preferably at least 70 weight percent, further preferably at least 80 weight percent, further more preferably at least 90 weight percent and most preferably at least 95 weight percent of the whole amount of the metal of the Groups from 3 to 12 in the Periodic Table which is contained in the surface-treated heat-expandable microspheres. An increase in the amount less than 10 weight percent makes the shell of the heat-expandable microspheres rigid and may result in poor expansion performance of the microspheres.

(Wetting Step)

Heat-expandable microspheres after the surface treatment are wet with a liquid at the wetting step. The wetting improves the workability of a heat-expandable microspheres to improve the dispersibility of the heat-expandable microspheres in mixing operation for various end uses.

The liquid employed in the wetting is not specifically restricted, but should preferably meet the requirements, i.e., having a higher boiling point than that of the blowing agent encapsulated in heat-expandable microspheres and not dissolving nor swelling the thermoplastic resin shell of heat-expandable microspheres.

The boiling point of the liquid employed at the wetting step should preferably range from 80 to 270 deg. C., more preferably from 90 to 260 deg. C., and most preferably from 100 to 250 deg. C.

The liquid employed at the wetting step is not specifically restricted, and includes, for example, plasticizers such as dibutyl phthalate, diisooctyl phthalate, dioctyl adipate, tricresyl phosphate, triethyl citrate, acetyl tributyl citrate, and octyl alcohol which are used to apply the microspheres obtained by the wetting for the manufacture of plastics, elastomers, sealants, and paints; and monomers such as dicyclopentadiene and styrene which are used to apply the microspheres obtained by the wetting for the manufacture of lightweight foamed and molded products or adhesives.

The employable liquids other than those mentioned above include water, nonionic surfactants, alkylene glycol, polyalkylene glycol, glycerin, silicone oils, liquid paraffins, process oils, and other oils. A combination of at least two of those liquids can be employed.

The amount of a liquid contained in heat-expandable microspheres which have been wet with the liquid at the wetting step is not specifically restricted, and determined according to the dust generation from or the workability of the heat-expandable microspheres.

The wetting is carried out by shaking and/or agitating heat-expandable microspheres and a liquid with an ordinary powder mixer or a mixer equipped with a counter shaft.

[Heat-Expandable Microspheres and their Application]

The heat-expandable microspheres of the present invention includes, as shown in FIG. 1, a shell (1) of a thermoplastic resin, and a thermally vaporizable blowing agent (2) being encapsulated therein. The heat-expandable microspheres of the present invention have a similar structure and appearance as those of the base-material microspheres mentioned above, though they sometimes have greatly different properties.

The thermoplastic resin constituting the shell of the heat-expandable microspheres of the present invention includes a copolymer produced by polymerizing a polymerizable component which contains a monomer component essentially including a carboxyl-group-containing monomer.

The heat-expandable microspheres of the present invention can be produced in a process including the surface treatment step mentioned above, though the process for producing the heat-expandable microspheres is not restricted within the scope of the process. The description about the heat-expandable microspheres and its application, which are contained in the explanation of the process mentioned above, may be hereinafter sometimes omitted to avoid redundancy. In this case, the explanation of the process mentioned above should be applied.

The amount of the metal of the Groups from 3 to 12 in the Periodic Table which is contained in the heat-expandable microspheres should preferably range from 0.05 to 15 weight percent of the heat-expandable microspheres, more preferably from 0.10 to 7 weight percent, further preferably from 0.13 to 5 weight percent, still further preferably from 0.14 to 3 weight percent, further more preferably from 0.15 to 1.5 weight percent, still further more preferably from 0.16 to 0.8 weight percent, and most preferably from 0.20 to 0.54 weight percent. If the amount of the metal of the Groups from 3 to 12 in the Periodic Table which is contained in the heat-expandable microspheres is lower than 0.05 weight percent, the resultant microspheres may have insufficient heat resistance. On the other hand, if the amount of the metal of the Groups from 3 to 12 in the Periodic Table which is contained in the heat-expandable microspheres is greater than 15 weight percent, the resultant microspheres may have rigid shell and low expansion ratio. Among the metals of the Groups from 3 to 12 in the Periodic Table, transition metals are preferable, and metals of the Groups 4 and 5 in the Periodic Table are more preferable. The detailed description of the metals contained in heat-expandable microspheres is the same as that for the metals constituting the metal-containing organic compounds.

The heat-expandable microspheres of the present invention should preferably contain high ratio of DMF-insoluble matter. The ratio of DMF-insoluble matter in the present invention is defined to be the percent of heat-expandable microspheres which remain after being shaken in DMF (N,N-dimethyl formamide) without being dissolved in it. (Refer to the Examples.) High ratio of DMF-insoluble matter implies that the thermoplastic resin shell of microspheres has dense structure owing to the cross-linking by a cross-linking agent and/or metal-containing organic compound, and has high solvent resistance. Heat-expandable microspheres containing high ratio of DMF-insoluble matter can minimize the migration of the encapsulated blowing agent through their shells, which become thin in thermal expansion, and retain good expansion performance.

The preferable ranges of the ratio of DMF-insoluble matter are those described below from 1) to 6) where a latter range is more preferable than a former and the maximum of the amount is 100 weight percent. A ratio of DMF-insoluble matter smaller than 75 percent result in insufficient retention of a blowing agent in microspheres and may deteriorate the expansion performance of the microspheres being subjected to high temperature for a long time.

The ranges are 1) at least 75 weight percent, 2) at least 80 weight percent, 3) at least 85 weight percent, 4) at least 89 weight percent, 5) at least 93 weight percent, and 6) at least 96 weight percent.

Some of conventional heat-expandable microspheres containing high ratio of DMF-insoluble matter include a thermoplastic resin shell having a dense structure throughout from its outermost to innermost layers. Such microspheres sometimes have low expansion ratio and fail to meet required expansion performance (refer to Comparative examples 2 and 3 described below). On the other hand, the heat-expandable microspheres of the present invention have a thermoplastic resin shell which is estimated to be densely cross-linked at its outermost layer to retain its softness, and thus the microspheres contain high ratio of DMF-insoluble matter. Owing to such shell, the microspheres retain their encapsulated blowing agent well and prevent the migration of the blowing agent out of them. Such microspheres can exhibit high expansion ratio especially in high temperature region.

A polyurethane composition including polyurethane and conventional heat-expandable microspheres dispersed in DMF remarkably loses its expansion performance with time. Such time-dependent decrease in the expansion performance of the composition will be greatly restrained, if the heat-expandable microspheres of the present invention, which have high solvent resistance, is employed instead of conventional heat-expandable microspheres.

If 5 parts by weight of the heat-expandable microspheres of the present invention are dispersed in 100 parts by weight of deionized water, the ranges of variation in the expansion-initiating temperature (ΔTs) and maximum expansion temperature (ΔTmax) of the microspheres after the dispersion should preferably be not greater than 10 percent, more preferably not greater than 8 percent, further preferably not greater than 5 percent, and most preferably not greater than 3 percent. The measuring methods for ΔTs and ΔTmax are described below in detail. In the measuring, the lower limits of ΔTs and ΔTmax sometimes reach to about −5 percent, which is estimated to be caused by error of measurement, but the lower limits are normally 0 percent.

In the present invention, the inventors have found that heat-expandable microspheres which include a shell of a thermoplastic resin including a copolymer produced from a carboxyl-group-containing monomer and result in a ΔTs and ΔTmax not greater than 10 percent have high solvent resistance. If one of or both of ΔTs and ΔTmax of heat-expandable microspheres are greater than 10 percent, the microspheres have poor solvent resistance.

Usually, heat-expandable microspheres produced from a carboxyl-group-containing monomer are highly hydrophilic. Therefore water penetrates into the thermoplastic resin constituting the shell of the microspheres dispersed in water, leading to the change (decrease in most cases) in their basic properties, such as the expansion initiating temperature and maximum expansion temperature. On the other hand, small ΔTs and ΔTmax of heat-expandable microspheres indicate that water hardly penetrates into the thermoplastic resin shell of the microspheres. This implies that dense polymer structure has been formed at least on and near the outer surface of the thermoplastic resin shell, and the structure is estimated to achieve high solvent resistance of the microspheres.

On the contrary, hydrophobic heat-expandable microspheres, which are not produced from hydrophilic monomers such as a carboxyl-group-containing monomer, do not allow water to penetrate into the shell including thermoplastic resin when such microspheres are dispersed in water. The ΔTs and ΔTmax of such microspheres do not vary usually, and cannot indicate the solvent resistance of the microspheres.

In the case that either or both of ΔTs and ΔTmax of heat-expandable microspheres are greater than 10 percent, the heat-expandable microspheres have poor solvent resistance as explained above. In addition, the expansion performance of such heat-expandable microspheres deteriorates after they are dispersed in water, and their stability in processing in an aqueous medium may be adversely affected. Especially, in a wet processing of heat-expandable microspheres with water, alkaline metals inonically bonded to the carboxyl group in the thermoplastic resin shell of the heat-expandable microspheres leads to increase in the ΔTmax of the microspheres and remarkably decrease the maximum expansion temperature of the microspheres.

The average particle size of the heat-expandable microspheres is not specifically restricted, but should preferably range from 1 to 100 μm, more preferably from 2 to 80 μm, further preferably from 3 to 60 μm, and most preferably from 5 to 50 μm.

The coefficient of variation, CV, in the particle size distribution of heat-expandable microspheres is not specifically restricted, but should preferably be not greater than 35 percent, more preferably not greater than 30 percent, and further preferably not greater than 25 percent. The coefficient of variation, CV, can be calculated by the expressions (1) and (2) shown below.

[Expression 1]

$$CV = (s/\langle x \rangle) \times 100 \text{ (percent)} \quad (1)$$

$$s = \left\{ \sum_{i=1}^{n} (xi - \langle x \rangle)^2 / (n-1) \right\}^{1/2} \quad (2)$$

(where "s" represents a standard deviation of the particle size of microspheres, <x> represents an average particle size, "xi" represents the particle size of i-th particle, and "n" represents the number of particles)

The retention ratio of a blowing agent encapsulated in heat-expandable microspheres is not specifically restricted, but should preferably range from 2 to 60 weight percent, more preferably from 5 to 50 weight percent, further preferably from 8 to 45 weight percent, and further more preferably from 10 to 40 weight percent to the weight of the heat-expandable microspheres.

The maximum expansion ratio of heat-expandable microspheres is not specifically restricted, but should preferably be at least 30 times, more preferably at least 45 times, further preferably at least 56 times, still further preferably at least 59 times, further more preferably at least 62 times, still further more preferably at least 65 times, and most preferably at least 80 times. The upper limit of the maximum expansion ratio of heat-expandable microspheres is 200 times.

The maximum expansion temperature of heat-expandable microspheres is not specifically restricted, but should preferably be at least 240 deg. C., more preferably at least 250 deg. C., further preferably at least 260 deg. C., further more preferably at least 270 deg. C., and most preferably at least 280 deg. C. The upper limit of the maximum expansion temperature of heat-expandable microspheres is 350 deg. C.

Figure 2:
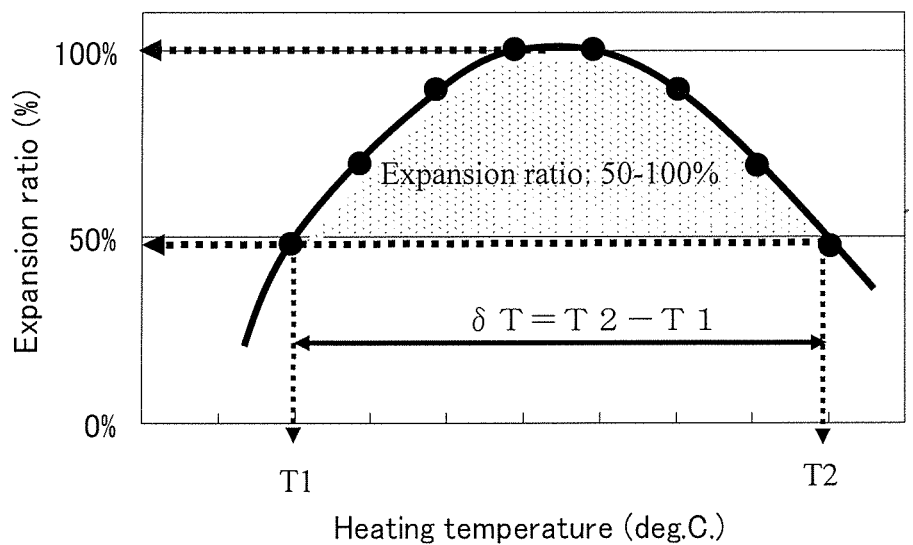
[FIG. 2] is a graph schematically representing the relation between the heating temperature and expansion ratio of heat-expandable microspheres, which have been heated and expanded

The heat-expandable microspheres of the present invention are workable in a broad temperature range, which is understood with the curve chart in FIG. 2. The procedure for making the curve chart is described below in detail.

At first, the expansion-initiating temperature (Ts1) of heat-expandable microspheres is measured (refer to the measurement of expansion-initiating temperature in the Example), and a temperature ($T_0$) is optionally set at a point lower than Ts1 by 10 to 20 deg. C. The heat-expandable microspheres are heated at a temperature which is elevated from $T_0$ to each of the predetermined heating temperatures (T) and held there for 4 minutes. Then the true specific gravity (d) of the microspheres after heating at each of the temperature is measured. The heating temperature, T, can be set optionally, for example, several temperatures being elevated from $T_0$ by regular intervals, such as 10 deg. C.

Then the expansion ratio (E) of heat-expandable microspheres at a heating temperature (T) is calculated by the following expression in which the true specific gravity of the microspheres before heating is represented as "$d_0$" (refer to the measurement of the expansion ratio in the Example).

$$E = d_0/d \text{ (times)}$$

The heating temperature (T) for microspheres is plotted on the x-axis and the expansion ratio (E) of the microspheres is plotted on the y-axis. Then the maximum of E is read to be defined as the maximum expansion ratio ($E_{max}$). The maximum expansion ratio ($E_{max}$) can be calculated by the following expression from the minimum true specific gravity ($d_{min}$) which is read in a graph where the heating temperature (T) for the microspheres is plotted on the x-axis and the true specific gravity (d) of the microspheres is plotted on the y-axis (refer to the measurement of the expansion ratio in the Example.).

$$E_{max}=d_0/d_{min} \text{ (times)}$$

Then the curve chart (FIG. 2) is drawn by connecting the points set by plotting the heating temperature (T) for the microspheres on the x-axis and the expansion ratio (percent) of the microspheres defined as $(E/E_{max})\times 100$ on the y-axis. The curve chart represents the relation between the heating temperature (T) for heat-expandable microspheres and the expansion ratio ($E/E_{max}\times 100$) of the microspheres when the microspheres are heated and expanded.

A temperature range ($\delta T$), in which heat-expandable microspheres of the present invention being heated for 4 minutes can expand to at least 50 percent of their maximum expansion ratio in 4-minute heating, should preferably be at least 30 deg. C., more preferably at least 40 deg. C., and further preferably at least 45 deg. C. The $\delta T$ can be defined as $\delta T=T2-T1$ where T1 is the lowest temperature and T2 is the highest temperature at which heat-expandable microspheres being heated for 4 minutes expand to at least 50 percent of their maximum expansion ratio as shown in FIG. 2. The temperature range, $\delta T$, indicates whether heat-expandable microspheres exhibit stable expansion performance in a broad temperature range or not. A molding composition which contains heat-expandable microspheres of the present invention having large $\delta T$ is workable in a broad temperature range and will exhibit stable expanding behavior in molding processes even with variable molding temperature. The maximum of $\delta T$ is 100 deg. C. Heat-expandable microspheres having a $\delta T$ smaller than 30 deg. C. may result in unstable expanding behavior in resin molding.

The range of T1 mentioned above is not specifically restricted, but should preferably be at least 200 deg. C., more preferably at least 220 deg. C., further preferably at least 240 deg. C., and most preferably at least 260 deg. C. The upper limit of T1 is 350 deg. C.

The range of T2 mentioned above is not specifically restricted, but should preferably be at least 240 deg. C., more preferably at least 260 deg. C., further preferably at least 280 deg. C., and most preferably at least 300 deg. C. The upper limit of T2 is 400 deg. C.

The heat-expandable microspheres of the present invention are workable over a long period. For example, the heat-expandable microspheres of the present invention exhibit stable and sufficient expansion performance at high temperature in resin molding not being influenced by the holding time in a cylinder of a molding machine, owing to its longer working life than that of conventional heat-expandable microspheres (refer to FIG. 12).

The working life mentioned here means a time range within which heat-expandable microspheres remain to be workable under heating at a high temperature such as a temperature between the expansion-initiating temperature and maximum expansion temperature of the microspheres. Heat-expandable microspheres subjected to high temperature are apt to lose their workability due to the migration of the blowing agent encapsulated therein. Thus the working life can be determined by measuring the time-dependent weight loss of heat-expandable microspheres heated at a temperature between their expansion-initiating temperature and maximum expansion temperature.

Heat-expandable microspheres are usually known to contain water which derives from the production process of the microspheres. Such water contained in heat-expandable microspheres evaporates at the initial stage of heating in the measurement of the weight loss of the heat-expandable microspheres mentioned above. The weight loss of the heat-expandable microspheres caused by the water evaporation, not by the migration of a blowing agent, is not ignorable, and the weight loss the heat-expandable microspheres must be measured considering the weight loss caused by the water evaporation. The method for measuring the weight loss of heat-expandable microspheres is described below in detail, on the premise of the water evaporation.

At first, the weight loss of heat-expandable microspheres is explained. The expansion-initiating temperature (Ts1) and maximum expansion temperature (Tmax1) of heat-expandable microspheres are measured prior to the measurement of the weight loss (refer to the explanation in the Example). Heat-expandable microspheres are usually processed in a temperature range between their expansion-initiating temperature (Ts1) and maximum expansion temperature (Tmax1). Thus the weight loss of heat-expandable microspheres is measured at a temperature (Th) determined by averaging Ts1 and Tmax1.

$$Th=(Ts1+Tmax1)/2$$

The range of "Th" is not specifically restricted, but should preferably be at least 150 deg. C., more preferably at least 180 deg. C., and further preferably at least 200 deg. C. The upper limit of "Th" should preferably be 350 deg. C. If "Th" is lower than 150 deg. C., the water evaporation may greatly influence on the weight loss measurement of heat-expandable microspheres.

The weight loss of heat-expandable microspheres which are heated at the heating temperature (Th) for "t" minutes, $LW_t$ (percent), can be calculated by the following expression where the weight of the microspheres (heat-expandable microspheres) before heating is represented by $W_0$, and the weight of the microspheres after heating at the heating temperature (Th) for "t" minutes is represented by $W_t$ (refer to the calculations for the weight loss coefficient (WL) and the weight loss ratio in 30-minute heating (percent) described in the Example).

$$LW_t=(W_0-W_t)/W_0\times 100 \text{ (percent)}$$

Figure 13:
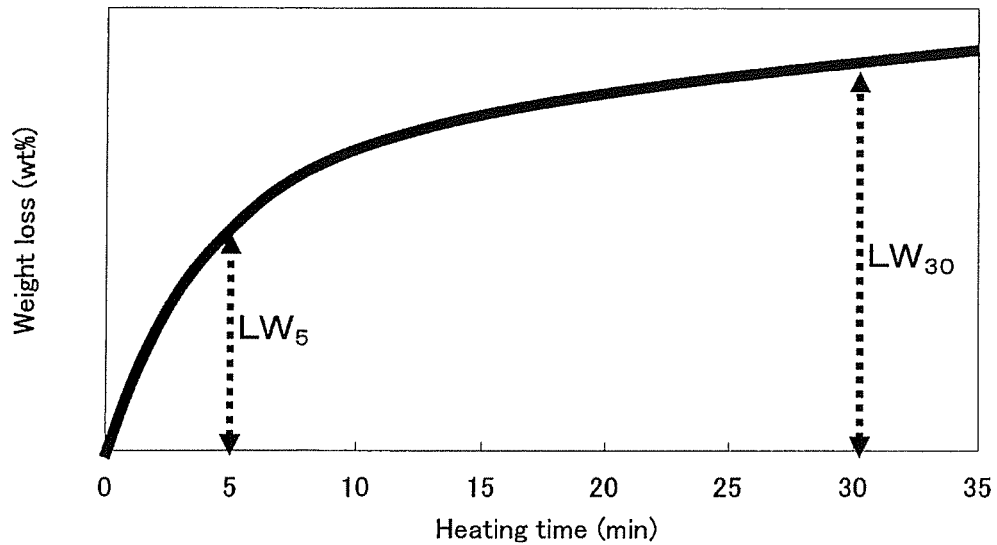
[FIG. 13] is a graph schematically representing the relation between the heating time and weight loss of heat-expandable microspheres, which have been heated and expanded at the mean temperature of the expansion-initiating and maximum expansion temperatures

A curve chart (FIG. 13) can be drawn by connecting points set by plotting the heating time ("t" minutes) for microspheres on the x-axis and plotting the weight loss of the microspheres ($LW_t$) on the y-axis. The curve chart represents the relation between the heating time ("t" minutes) and weight loss ($LW_t$) of heat-expandable microspheres heated and expanded. The heating time can be set optionally, for example, every 5 minutes except the initial 5 minutes to avoid the influence by water evaporation which intensely occurs at the initial stage of heating.

Then the weight loss coefficient (WL) of heat-expandable microspheres is defined by the following expression to determine the length of the working life of the microspheres.

$$WL=(LW_{30}-LW_5)/CR$$

(where "$LW_5$" represents the weight loss (percent) of the heat-expandable microspheres after 5-minute heating; "$LW_{30}$" represents the weight loss (percent) of the heat-expandable microspheres after 30-minute heating; and CR represents the retention ratio (percent) of the blowing agent encapsulated in the heat-expandable microspheres.)

"Th" is usually higher than 100 deg. C., the boiling point of water, and the water in heat-expandable microspheres is estimated to have almost evaporated after heating the microspheres at "Th" for 5 minutes. Thus the difference between the weight losses after 5-minute heating and 30-minute heating can be estimated to be the amount of the blowing agent migrating out of the microspheres. For the purpose of compensating the influence by the retention ratio of the blowing agent encapsulated in the microspheres on the difference between the weight losses mentioned above, the weight losses mentioned above is divided by the retention ratio of the blowing agent encapsulated in the microspheres, and the result is defined to be the weight loss coefficient (WL).

The weight loss coefficient (WL) of heat-expandable microspheres is not specifically restricted, but should preferably be not greater than 0.45, more preferably not greater than 0.40, further preferably not greater than 0.35, further more preferably not greater than 0.30, and most preferably not greater than 0.25. The lower limit of the weight loss coefficient of heat-expandable microspheres is 0. Heat-expandable microspheres having a weight loss coefficient within the range mentioned above has long working life, and a composition containing the heat-expandable microspheres exhibits stable expanding behavior in molding operation even if the molding time is variable. Heat-expandable microspheres having a weight loss coefficient greater than 0.45 may fail to stabilize the expanding behavior of a resin composition containing the microspheres in molding operation. The working life of heat-expandable microspheres can be evaluated by the weight loss ratio in 30-minute heating (percent) as defined below.

Weight loss ratio in 30-minute heating (percent)= $(LW_{30}/WG) \times 100$ (where "$LW_{30}$" represents the weight loss (percent) of heat-expandable microspheres after 30-minute heating; and WG represents the sum of the moisture content (percent) and the retention ratio of the blowing agent (percent) encapsulated in the microspheres before heating)

The weight loss ratio in 30-minute heating is not specifically restricted, but should preferably be not greater than 95 percent, more preferably not greater than 90 percent, further preferably not greater than 85 percent, further more preferably not greater than 80 percent, and most preferably not greater than 75 percent. The lower limit of the weight loss ratio in 30-minute heating is 5 percent.

The heat-expandable microspheres of the present invention should preferably be wet with a liquid. The wetting is described above.

The hollow particulates of the present invention can be produced by heating and expanding the heat-expandable microspheres mentioned above and/or heat-expandable microspheres produced in a production process for heat-expandable microspheres. The heating and expanding method is not specifically restricted, and can include dry thermal expansion methods and wet thermal expansion methods.

The examples of the dry thermal expansion methods are those described in JP A 2006-213930, especially, the injection method. Other dry thermal expansion methods are those described in JP A 2006-96963. The examples of the wet thermal expansion methods are those described in JP A 62-201231.

The particle size of hollow particulates is not specifically restricted, but should preferably range from 1 to 1000 μm, more preferably from 5 to 800 μm, and further preferably from 10 to 500 μm. The coefficient of variation, CV, of the particle size distribution of hollow particulates is not specifically restricted, but should preferably be not greater than 30 percent, more preferably not greater than 27 percent, and further preferably not greater than 25 percent.

The composition of the present invention includes at least one particulate material selected from the group consisting of heat-expandable microspheres of the present invention, heat-expandable microspheres produced in the production process of the present invention, and hollow particulates of the present invention; and a base component.

The base component is not specifically restricted, and includes, for example, rubbers, such as natural rubber, butyl rubber, silicone rubber and ethylene-propylene-diene rubber (EPDM); thermosetting resins, such as epoxy resins and phenolic resins; waxes, such as polyethylene wax and paraffin wax; thermoplastic resins, such as ethylene-vinyl acetate copolymer(EVA), ionomer, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resin (nylon6, nylon66 etc.), polycarbonate, polyethylene terephthalate (PET), polybutylene terephthalate (PBT), polyacetal (POM) and polyphenylene sulfide (PPS); thermoplastic elastomers such as olefin elastomer and styrene elastomer; bioplastics, such as polylactic acid (PLA), cellulose acetate, PBS, PHA and starch resin; sealant materials, such as modified silicones, urethanes, polysulfides, acrylates, silicones, polyisobutylenes and butyl rubber; paint components, such as urethanes, ethylene-vinyl acetate copolymers, vinyl chlorides and acrylates; and inorganic materials, such as cement, mortar and cordierite.

The composition of the present invention can be prepared by mixing the base component, heat-expandable microspheres and/or hollow particulates.

The application of the composition of the present invention includes, for example, molding compositions, paint compositions, clay compositions, fiber compositions, adhesive compositions, and powder compositions.

The composition of the present invention can be employed as the master-batch composition for resin molding, if the composition includes heat-expandable microspheres, and, as a base component, a compound and/or a thermoplastic resin having a melting point lower than the expansion-initiating temperature of the heat-expandable microspheres (for example, waxes such as polyethylene wax and paraffin wax; thermoplastic resins, such as ethylene-vinyl acetate copolymer (EVA), ionomer, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polycarbonate, polyethylene terephthalate (PET) and polybutylene terephthalate (PBT); and thermoplastic elastomers, such as olefin elastomer and styrene elastomer). The master-batch composition for resin molding can be employed in injection molding, extrusion molding and pressure molding, and is preferably employed for introducing bubbles in the compositions for resin molding. The resin employed for resin molding is not specifically restricted, except that it is selected from the base components mentioned above, and include, for example, ethylene-vinyl acetate copolymer (EVA), ionomer, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resin (nylon6, nylon66, etc.), polycarbonate, polyethylene terephthalate (PET), polybutylene terephthalate (PBT), polyacetal (POM), polyphenylene sulfide (PPS), olefin elastomer, styrene elastomer, polylactic acid (PLA), cellulose acetate, PBS, PHA, starch resin, natural rubber, butyl rubber, silicone rubber, ethylene-propylene-diene rubber (EPDM), and a mixture thereof. The composition can contain reinforcing fibers, such as glass fiber and carbon fiber.

The formed product of the present invention can be manufactured by forming the composition. The formed product of the present invention include, for example, formed articles and formed materials such as coatings. The formed product of the present invention has improved properties including, light weight property, porousness, sound absorbency, thermal insulation property, low thermal conductivity, low dielectric constant, design, shock absorption and strength.

A formed product containing an inorganic compound can be processed into ceramic filters, etc. by calcination.

EXAMPLE

The heat-expandable microspheres of the present invention are specifically explained with the following Examples, though the present invention is not restricted within the scope of the Examples. In the following Examples and Comparative examples, "percent" means "weight percent" unless otherwise specified.

The properties and performances of the base-material microspheres and heat-expandable microspheres described in the following Examples of production, Examples and Comparative examples were measured and evaluated in the methods described below. Hereinafter the base-material microspheres and heat-expandable microspheres may be sometimes referred to as "microspheres" for simplifying the description.

[Determination of Average Particle Size and Particle Size Distribution]

A laser diffraction particle size analyzer (HEROS & RODOS, manufactured by SYMPATEC) was employed as the device for the determination. Microspheres were analyzed in dry system with a dry dispersion unit, where the dispersion pressure was controlled at 5.0 bar and the degree of vacuum was controlled at 5.0 mbar. The median particle size ($D_{50}$ value) was determined as an average particle size.

[Determination of the Moisture Content of Microspheres]

The moisture content was determined with a Karl Fischer moisture meter (MKA-510N, produced by Kyoto Electronics Manufacturing Co., Ltd.).

[Determination of the Retention Ratio of a Blowing Agent Encapsulated in Microspheres]

One gram of microspheres were placed in a stainless steel evaporating dish (15 mm deep and 80 mm in diameter), and weighed out ($W_1$). Then 30 ml of DMF was added to disperse the microspheres uniformly. After being left for 24 hours at room temperature, the microspheres were dried at 130 degree. C. for 2 hours under reduced pressure, and the dry weight ($W_2$) was determined. The retention ratio of the encapsulated blowing agent (CR) was calculated by the following expression.

$$CR \text{ (weight percent)} = (W_1 - W_2) \text{ (g)}/1.0 \text{ (g)} \times 100 - \text{(moisture content) (weight percent)}$$

(The moisture content in the expression was determined by the method described above.)

[Determination of True Specific Gravity]

The true specific gravity of heat-expandable microspheres and hollow particulates produced by thermally expanding the heat-expandable microspheres were determined in the following method.

The true specific gravity was determined in the liquid substitution method (Archimedean method) with isopropyl alcohol in an atmosphere at 25 deg. C. and 50% RH (relative humidity).

Specifically, an empty 100-ml measuring flask was dried and weighed ($WB_1$), then isopropyl alcohol was poured into the weighed measuring flask to accurately form meniscus, and the measuring flask filled with isopropyl alcohol was weighed ($WB_2$).

The 100-ml measuring flask was then emptied, dried, and weighed ($WS_1$). The weighed measuring flask was then filled with about 50 ml of microspheres, and the measuring flask filled with the microspheres was weighed ($WS_2$). Then isopropyl alcohol was poured into the measuring flask filled with the microspheres to accurately form meniscus without taking bubbles into the isopropyl alcohol, and the flask filled with the microspheres and isopropyl alcohol was weighed ($WS_3$). The values, $WB_1$, $WB_2$, $WS_1$, $WS_2$, and $WS_3$, were introduced into the following expression to calculate the true specific gravity (d) of the microspheres.

$$d = \{(WS_2 - WS_1) \times (WB_2 - WB_1)/100\}/\{(WB_2 - WB_1) - (WS_3 - WS_2)\}$$

The true specific gravities of heat-expandable microspheres and hollow particulates were calculated in the above-mentioned method.

[Determination of the Expansion Ratio of Microspheres]

A flat 12-cm long, 13-cm wide, and 9-cm high box was made of aluminum foil, and 1.0 g of microspheres were placed in the box uniformly. Then the microspheres were heated at a prescribed temperature for 4 minutes in a Geer oven, and the true specific gravity of the heated microspheres was determined. The expansion ratio (E) of the microspheres was calculated by dividing the true specific gravity ($d_0$) of the microspheres before heating by the true specific gravity (d) of the heated microspheres. The maximum expansion ratio ($E_{max}$) is the expansion ratio of the microspheres which have expanded to the maximum.

[Determination of the Amount of a Metal of the Groups from 3 to 12 in the Periodic Table Contained in Microspheres]

The decomposition of microspheres were carried out by placing 0.1 g of microspheres and 5 ml of nitric acid (reagent for detecting hazardous metals, produced by Wako Pure Chemical Industries, Ltd.) in a quartz vessel and treating them with a microwave wet digestion system (Multiwave, produced by Anton Paar) through the following steps 1 to 4 in the order.

Step 1: treatment with the output power of 300 W for 4 minutes

Step 2: treatment with the output power starting from 400 W and elevated to 600 W at the rate of 33.3 W/min for 6 minutes Step 3: treatment with the output power starting from 700 W and elevated to 800 W at the rate of 3.3 W/min for 30 minutes Step 4: cooling down for 20 minutes without the output power The resultant sample from the digestion was analyzed with an ICP optical emission spectrometer (ICPS-8100, produced by Shimadzu Corporation) to determine the amount of a metal of the Group 3 to 12 in the Periodic Table being contained in the sample. The result was calculated into the amount (weight percent) of the metal of the Group 3 to 12 in the Periodic Table being contained in the microspheres. The amount (weight percent) of the metal of the Group 12 in the Periodic Table was also calculated. In the tables below, the amount of the metals lower than a detectable limit (usually less than about 100 ppm) was expressed as "ND". In the Examples and Comparative examples, only the metals derived from the metal-containing organic compounds or metal compounds used for microspheres were detected.

[Determination of the Ratio of DMF (N,N-Dimethyl Formamide)-Insoluble Matter]

In a glass vessel (36 mm in inside diameter) conditioned to a constant weight ($WP_0$), 1 g of microspheres and 29 g of DMF were placed and shaken at 25 deg. C. for 24 hours (with a desktop shaker, NR-30, produced by Taitec Co., Ltd., at a shaking rate of 15 $min^{-1}$). The mixture was separated with a desktop cooling centrifuge (produced by Kokusan Co., Ltd., H-3R, with a RF-110 rotor and MC-110 bucket, at the rate of 3500 rpm, at 15 deg. C., for 1 hour). Then the supernatant liquid was removed and the gel in the glass vessel was vacuum-dried and solidified at 130 deg. C. for 1 hour. The dried gel in the glass vessel was transferred to a desiccator containing silica gel to be cooled down to room temperature. The weight ($WP_2$) of the glass vessel containing the dried gel was measured, and the ratio of DMF-insoluble matter (WP) was calculated by the following expression.

$$WP = WP_2 - WP_0$$

The weight of the polymer ($WP_1$) in 1 g of the microspheres was calculated by the following expression from the retention ratio of the blowing agent encapsulated in the microspheres (percent) and the moisture content (percent) of the microspheres determined in the methods mentioned above.

$$WP_1 = 1 - (\text{retention ratio of an encapsulated blowing agent} + \text{moisture content})/100$$

Then the ratio of DMF-insoluble matter (weight percent) of the microspheres was calculated by the following expression from the weight of the polymer ($WP_1$) and the ratio of DMF-insoluble matter (WP) in 1 g of the microspheres.

Ratio of DMF-insoluble matter (weight percent)= $(WP/WP_1) \times 100$

[Determination of Expansion-Initiating Temperature (Ts1) and Maximum-Expansion Temperature (Tmax1)]

Those temperatures were determined with a DMA (a kinetic viscoelasticity measuring device: DMA Q800, manufactured by TA Instruments). In an aluminum cup 4.8 mm deep and 6.0 mm in diameter (5.65 mm in inside diameter), 0.5 mg of heat-expandable microspheres were placed, and the cup was covered with an aluminum cap 0.1 mm thick and 5.6 mm in diameter to prepare a sample. The sample was subjected to the pressure of 0.01 N with the compression unit of the device, and the height of the sample was measured. The sample was then heated at a temperature elevated at a rate of 10 deg. C./min in the range from 20 to 300 deg. C., being subjected to the pressure of 0.01 N with the compression unit, and the vertical change of the position of the compression unit was measured. The temperature at which the compression unit started to change its position to the positive direction was determined as the expansion-initiating temperature (Ts1), and the temperature at which the compression unit indicated the greatest change was determined as the maximum-expansion temperature (Tmax1).

[Determination of the Expansion-Initiating Temperature (Ts2) and Maximum Expansion Temperature (Tmax2) of Microspheres after being Dispersed in Deionized Water]

A mixture prepared by adding 5 parts by weight of microspheres to 100 parts by weight of deionized water was shaken for 30 minutes to disperse the microspheres. Then the microspheres were filtered and dried. The expansion-initiating temperature (Ts2) and maximum expansion temperature (Tmax2) of the microspheres after the dispersion were determined as mentioned above.

[Calculation of the Range of Variation in Expansion-Initiating Temperature (ΔTs) and the Range of Variation in Maximum Expansion Temperature (ΔTmax)]

The range of variation in expansion-initiating temperature (ΔTs) and the range of variation in maximum expansion temperature (ΔTmax) of microspheres after dispersing the microspheres in deionized water were calculated by the following expressions from Ts1, Ts2, Tmax1 and Tmax2 of the microspheres determined as mentioned above.

$$\Delta Ts = (Ts1 - Ts2)/Ts1 \times 100$$

$$\Delta Tmax = (Tmax1 - Tmax2)/Tmax1 \times 100$$

In the following Examples of production and Examples, the description, "an X-percent Y solution", means "a solution containing X percent of Y".

[Determination of the Specific Gravity of a Formed Resin Product]

The specific gravity of a formed resin product was determined in the liquid substitution method with a precision gravimeter, AX200, produced by Shimadzu Corporation.

[Calculation of the Weight Loss Coefficient (WL) and the Weight Loss Ratio after Heating for 30 Minutes]

In the box used for the determination of the expansion ratio of microspheres, 1.0 g of heat-expandable microspheres were uniformly placed and heated for "t" minutes at the average temperature (Th) of their expansion-initiating temperature, Ts1, and maximum expansion temperature, Tmax1. Then the weight of the heated microspheres (We) was measured to calculate their weight loss, $LW_t$ (percent), by the following expression. The weight loss, $LW_5$, in the case that "t"=5 and the weight loss, $LW_{30}$, in the case that "t"=30 were calculated to calculate the weight loss coefficient of the microspheres, WL. In the expression, CR represents the retention ratio of the blowing agent (percent) encapsulated in the microspheres.

$$LW_t = (W_0 - W_t)/W_0 \times 100 \text{ (percent)}$$

$$WL = (LW_{30} - LW_5)/CR$$

The weight loss ratio (percent) after heating for 30 minutes was calculated by the following expression from the $LW_{30}$ mentioned above and the sum (WG) of the moisture content (percent) and the retention ratio of the blowing agent (percent) of the microspheres.

Weight loss ratio after heating for 30 minute (percent)= $(LW_{30}/WG) \times 100$

[Example of Production 1]

An aqueous dispersion medium was prepared by adding 150 g of sodium chloride, 70 g of colloidal silica containing 20 weight percent of silica, 1.0 g of polyvinyl pyrolidone and 0.5 g of ethylenediamine tetraacetic tetrasodium salt to 600 g of deionized water and by controlling the pH of the mixture in the range from 2.8 to 3.2.

On the other hand, an oily mixture was prepared by mixing 120 g of acrylonitrile, 115 g of methacrylonitrile, 65 g of methacrylic acid, 1.0 g of 1,9-nonanediol diacrylate, 90 g of isooctane, and 8 g of a 50-percent di-sec-butyl peroxydicarbonate solution.

The aqueous dispersion medium and the oily mixture were mixed, and the liquid mixture was dispersed into a suspension with a Homomixer (T.K. Homo-mixer manufactured by Tokushu Kika Kogyou). Then the suspension was transferred into a compressive reactor of 1.5-liter capacity, purged with nitrogen, and polymerized at 60 deg. C. for 20 hours by agitating the suspension at 80 rpm and controlling the initial reaction pressure at 0.5 MPa. After the polymerization, the liquid was filtered to separate the base-material microspheres which were then dried. The properties of the resultant base-material microspheres are shown in Table 1.

[Examples of Production 2 to 10]

Base-material microspheres were produced in the same manner as in Example of production 1 except that the components and their amounts were replaced with those shown in Table 1. The properties of the resultant base-material microspheres are shown in Table 1.

The base-material microspheres produced in Examples of production 1 to 10 are respectively referred to as base-material microspheres (1) to (10).

TABLE 1

| | | Example of production 1 Base-material microsphere(1) | Example of production 2 Base-material microsphere(2) | Example of production 3 Base-material microsphere(3) | Example of production 4 Base-material microsphere(4) | Example of production 5 Base-material microsphere(5) | Example of production 6 Base-material microsphere(6) | Example of production 7 Base-material microsphere(7) | Example of production 8 Base-material microsphere(8) | Example of production 9 Base-material microsphere(9) | Example of production 10 Base-material microsphere(10) |
|---|---|---|---|---|---|---|---|---|---|---|---|
| Aqueous dispersion medium (g) | Demineralized water | 600 | 600 | 600 | 600 | 600 | 600 | 600 | 600 | 600 | 600 |
| | NaCl | 150 | 150 | 150 | 150 | 150 | 150 | 150 | 150 | 150 | 150 |
| | Colloidal silica | 70 | 60 | 50 | 40 | 40 | 40 | | 40 | 40 | 40 |
| | Alumina sol | | | | | | | 50 | | | |
| | PVP | 1 | 1 | 1 | 1 | 1 | 1 | | 1 | 1 | 1 |
| | Adipic acid-DEA condensate | | | | | | | 1 | | | |
| | EDTA | 0.5 | 0.5 | 0.5 | 0.5 | 0.5 | 0.5 | 0.5 | 0.5 | 0.5 | 0.5 |
| | pH | 3 | 3 | 3 | 3 | 3 | 3 | 3 | 3 | 3 | 3 |
| Oily mixture (g) | Oily mixture | AN | 120 | 75 | 45 | 30 | 50 | 30 | 30 | 5 | 30 | 30 |
| | MAN | 115 | 135 | 120 | 100 | 50 | 40 | 100 | 125 | 100 | 100 |
| | MAA | 65 | 90 | 135 | 170 | 200 | 230 | 170 | 170 | 170 | 170 |
| | 1,9ND-A | 1 | 1 | 1 | 1 | 1 | | 1 | | | |
| | TMP | | | | | | 1 | | | 0.5 | 0.5 |
| | BEPG-A | | | | | | | | | 0.5 | |
| Cross-linking agent | SBP | 8 | 8 | 8 | 8 | 8 | 8 | 8 | 8 | 8 | 8 |
| Polymerization initiator | | | | | | | | | | | |
| Blowing agent | Isooctane | 90 | 70 | 85 | 80 | 85 | 80 | 80 | 30 | 30 | 65 |
| | Isododecane | | | | | | | | 50 | 50 | 15 |
| | Isohexadecane | | | | | | | | | | |
| Properties of base-material microsphere | Particle size (D50) μm | 20 | 25 | 26 | 38 | 25 | 34 | 38 | 32 | 36 | 34 |
| | Moisture content (%) | 2.4 | 2.2 | 2.3 | 2.6 | 2.1 | 2.8 | 2.6 | 2.7 | 2.5 | 2.5 |
| | Retention ratio of a blowing agent (%) | 21.1 | 17.6 | 20.4 | 18.4 | 19.2 | 18.7 | 18.4 | 18.8 | 18.1 | 18.4 |
| | Sum of moisture content and retention ratio of a blowing agent (%) | 23.5 | 19.8 | 22.7 | 21.0 | 21.3 | 21.5 | 21.0 | 21.5 | 20.6 | 20.9 |
| | True specific gravity (g/ml) | | | 1.01 | 1.01 | 1.03 | 1.06 | 1.03 | 1.02 | 1.04 | 1.03 |
| | Ts1 (deg. C.) | 190 | 195 | 198 | 200 | 201 | 205 | 200 | 242 | 259 | 217 |
| | Tmax1 (deg. C.) | 213 | 226 | 229 | 233 | 235 | 238 | 233 | 254 | 263 | 234 |
| | Maximum expansion ratio (times) | 65 | 78 | 75 | 80 | 57 | 48 | 80 | 73 | 25 | 53 |
| | Amount of Group 3-12 metal (%) | UD | UD | UD | UD | UD | UD | UD | UD | UD | UD |
| | Amount of Group 12 metal (%) | UD | UD | UD | UD | UD | UD | UD | UD | UD | UD |
| | Ratio of DMF-insoluble matter (%) | 65 | 68 | 70 | 72 | 73 | 71 | 72 | 21 | 65 | 69 |
| | Ts2 (deg. C.) | 170 | 174 | 181 | 183 | 181 | 187 | 182 | 215 | 228 | 189 |
| | Tmax2 (deg. C.) | 190 | 195 | 199 | 201 | 208 | 209 | 208 | 238 | 240 | 212 |
| | ΔTs | 10.5% | 10.8% | 8.6% | 8.5% | 10.0% | 8.8% | 9.0% | 11.2% | 11.7% | 12.7% |
| | ΔTmax | 10.8% | 13.7% | 13.1% | 13.7% | 11.5% | 12.2% | 10.7% | 6.3% | 8.7% | 9.4% |
| | δT (deg. C.) | | | 26 | 22 | 45 | 40 | 23 | 19 | | |
| | Th (deg. C.) | 202 | 211 | 214 | 217 | 218 | 222 | 217 | 248 | | |
| | LW$_5$ (wt %) | 12.3 | 8.9 | 10.3 | 9.8 | 9.9 | 12.4 | 11.4 | 11.6 | | |

TABLE 1-continued

| | Example of production 1 Base-material microsphere(1) | Example of production 2 Base-material microsphere(2) | Example of production 3 Base-material microsphere(3) | Example of production 4 Base-material microsphere(4) | Example of production 5 Base-material microsphere(5) | Example of production 6 Base-material microsphere(6) | Example of production 7 Base-material microsphere(7) | Example of production 8 Base-material microsphere(8) | Example of production 9 Base-material microsphere(9) | Example of production 10 Base-material microsphere(10) |
|---|---|---|---|---|---|---|---|---|---|---|
| $LW_{30}$ (wt %) | 23.5 | 19.7 | 22.7 | 20.8 | 21.3 | 21.5 | 21.0 | 21.2 | | |
| Weight loss coefficient | 0.53 | 0.61 | 0.61 | 0.60 | 0.59 | 0.49 | 0.52 | 0.51 | | |
| Weight loss ratio in 30-minute heating (%) | 100 | 99.5 | 100.0 | 99.0 | 100.0 | 100.0 | 100.0 | 98.6 | | |

EXAMPLE 1

To the liquid after the polymerization in Example of production 1, 55 g of an 80-percent diisopropoxytitanium bis(triethanol aminate) solution, as a metal-containing organic compound, was added with agitation at room temperature. The resultant dispersion mixture was transferred into a compressive reactor (1.5-liter capacity), purged with nitrogen, and processed at 80 deg. C. for 5 hours by agitating the mixture at the rate of 80 rpm and controlling the initial reaction pressure at 0.5 MPa. The resultant product was filtered and dried to obtain heat-expandable microspheres. The properties of the microspheres are shown in Table 2.

EXAMPLES 2 to 9, and 17, and Comparative Examples 4 and 6

Heat-expandable microspheres were produced in the same manner as in Example 1 except that the liquid after the polymerization, metal-containing organic compounds (metal compounds in Comparative example 4 and 6) and their amounts were replaced with those shown in Tables 2 to 4. The properties of the resultant heat-expandable microspheres are shown in Tables 2 to 4.

EXAMPLE 10

The liquid after the polymerization in Example 4 was filtered to separate the base-material microspheres which were then dried. The base-material microspheres in an amount of 400 g were uniformly re-dispersed in 800 g of deionized water, and 15 g of an 80-percent diisopropoxytitanium bis(triethanol aminate) solution was added with agitation at room temperature as a metal-containing organic compound. The resultant dispersion mixture was transferred into a compressive reactor (1.5-liter capacity), purged with nitrogen, and processed at 80 deg. C. for 5 hours by agitating the mixture at the rate of 80 rpm and controlling the initial reaction pressure at 0.5 MPa. The resultant product was filtered and dried to obtain heat-expandable microspheres. The properties of the microspheres are shown in Table 2.

EXAMPLES 11 to 14, and 18

The heat-expandable microspheres were produced in the same manner as in Example 10 except that the base-material microspheres, and metal-containing organic compounds and their amounts were replaced with those shown in Tables 2 to 4. The properties of the resultant heat-expandable microspheres are shown in Tables 2 and 4.

COMPARATIVE EXAMPLE 1

The polymerization was carried out in the same manner as that in Example of production 1 except that 55 g of a 80-percent diisopropoxytitanium bis(triethanol aminate) solution was added as a metal-containing organic compound to the liquid mixture of the aqueous dispersion medium and oily mixture. However, the ingredients solidified in the reaction and heat-expandable microspheres could not be produced.

COMPARATIVE EXAMPLES 2, 3 and 5

The polymerization was carried out in the same manner as that in Comparative example 1, except that the liquid mixtures for polymerization, and the metal compounds and their ratio were replaced with those shown in Table 3. In Comparative examples 2, 3 and 5, heat-expandable microspheres were produced contrary to the polymerization in Comparative example 1 in which heat-expandable microspheres could not be produced. The properties of the microspheres are shown in Table 3.

In Comparative examples 1 to 3 and 5, heat-expandable microspheres were produced in polymerization in the presence of metal compounds and the surface of base-material microspheres was not treated.

EXAMPLE 15

Fifty grams of a 67-percent dioctyloxytitanium bis(octylene glycolate) solution was sprayed to 400 g of the base-material microspheres (with 2.6-percent moisture content) produced in Example of production 4 which were being agitated, and the agitation was continued for 30 minutes. Then the mixture was heated at 80 deg. C. for 3 hours, and dried at 80 deg. C. in a reduced-pressure drier to be produced into heat-expandable microspheres. The properties of the microspheres are shown in Table 4.

EXAMPLE 16

Four hundred grams of the base-material microspheres (with 2.6-percent moisture content) produced in Example of production 4 was fluidized and agitated in a 10-liter fluidized bed, 47.5 g of a 50-percent titanium butoxy dimer solution was sprayed to the microspheres, and the fluidization and agitation were continued for 30 minutes. Then the mixture was heated at 80 deg. C. for 1 hour, and dried at 80 deg. C. in a reduced-pressure drier to be produced into heat-expandable microspheres. The properties of the microspheres are shown in Table 4.

The base-material microspheres produced in Examples of production 1 to 10 are respectively referred to as base-material microspheres (1) to (10). The heat-expandable microspheres produced in Examples 1 to 18 are respectively referred to as microspheres (1) to (18). The heat-expandable microspheres produced in the Comparative examples 1 to 6 are respectively referred to as Comparative microspheres (1) to (6).

TABLE 2

|  | Example 1 Microsphere (1) | Example 2 Microsphere (2) | Example 3 Microsphere (3) | Example 4 Microsphere (4) | Example 5 Microsphere (5) | Example 6 Microsphere (6) | Example 7 Microsphere (7) |
|---|---|---|---|---|---|---|---|
| Base-material microsphere | Example of production 1 | Example of production 1 | Example of production 2 | Example of production 2 | Example of production 3 | Example of production 3 | Example of production 3 |
| Time of addition | continuously after polymerization | continuously after polymerization | continuously after polymerization | continuously after polymerization | continuously after polymerization | continuously after polymerization | continuously after polymerization |
| Metal-containing organic compound (M compound) | diisopropoxy titanium | diisopropoxy titanium | dihydroxy titanium | dihydroxy titanium | dihydroxy titanium | dihydroxy titanium | diisopropoxy titanium |

TABLE 2-continued

|  | bis (triethanol aminate) | bis (triethanol aminate) | bis (lactate) | bis (lactate) | bis (lactate) diammonium salt | bis (lactate) diammonium salt | bis (triethanol aminate) |
|---|---|---|---|---|---|---|---|
| Concentration (%) | 80% | 80% | 44% | 44% | 42% | 42% | 80% |
| Amount added (g) | 55 | 80 | 30 | 90 | 20 | 65 | 35 |
| M compound/dispersion mixture (%) | 3.45% | 4.92% | 1.08% | 3.09% | 0.69% | 2.17% | 2.28% |
| Molar ratio of M compound | 0.126 | 0.184 | 0.049 | 0.146 | 0.018 | 0.059 | 0.039 |
| Particle size (D50) μm | 20 | 20 | 25 | 25 | 26 | 26 | 26 |
| Moisture content (%) | 2.4 | 2.4 | 2.2 | 2.2 | 2.3 | 2.3 | 2.3 |
| Retention ratio of a blowing agent (%) | 20.8 | 19.9 | 17.6 | 17.6 | 20.4 | 20.4 | 20.4 |
| Sum of moisture content and retention ratio of a blowing agent (%) | 23.2 | 22.3 | 19.8 | 19.8 | 22.7 | 22.7 | 22.7 |
| True specific gravity (g/ml) |  |  |  |  | 1.04 | 1.06 | 1.04 |
| Ts1 (deg. C.) | 180 | 183 | 187 | 195 | 199 | 198 | 198 |
| Tmax1 (deg. C.) | 241 | 245 | 242 | 268 | 255 | 268 | 262 |
| Maximum expansion ratio (times) | 77 | 71 | 78 | 60 | 74 | 64 | 68 |
| Amount of Group 3-12 metal (%) | 0.84 | 1.22 | 0.47 | 1.52 | 0.28 | 0.88 | 0.52 |
| Amount of Group 12 metal (%) | UD | UD | UD | UD | UD | UD | UD |
| Ratio of DMF-insoluble matter (%) | 97 | 99 | 92 | 98 | 95 | 99 | 97 |
| $Ts_2$ (deg. C.) | 175 | 176 | 183 | 189 | 197 | 198 | 198 |
| $Tmax_2$ (deg. C.) | 235 | 236 | 229 | 258 | 249 | 258 | 254 |
| ΔTs | 2.8% | 3.8% | 2.1% | 3.1% | 1.0% | 0.0% | 0.0% |
| ΔTmax | 2.5% | 3.7% | 5.4% | 3.7% | 2.4% | 3.7% | 3.1% |
| δT (deg. C.) |  |  |  |  | 48 | 55 | 48 |
| Th (deg. C.) | 211 | 214 | 215 | 232 | 227 | 233 | 230 |
| $LW_5$ (wt %) | 13.2 | 13.4 | 11.7 | 11.4 | 11.2 | 10.5 | 10.8 |
| $LW_{30}$ (wt %) | 18.6 | 17.4 | 16.9 | 15.3 | 15.2 | 13.5 | 14.3 |
| Weight loss coefficient | 0.26 | 0.20 | 0.30 | 0.22 | 0.20 | 0.15 | 0.17 |
| Weight loss ratio in 30-minute heating (%) | 80.2 | 78.0 | 85.4 | 77.3 | 67.0 | 59.5 | 63.0 |

|  | Example 8 Microsphere (8) | Example 9 Microsphere (9) | Example 10 Microsphere (10) | Example 11 Microsphere (11) | Example 12 Microsphere (12) | Example 13 Microsphere (13) | Example 14 Microsphere (14) |
|---|---|---|---|---|---|---|---|
| Base-material microsphere | Example of production 4 | Example of production 4 | Example of production 4 | Example of production 5 | Example of production 6 | Example of production 7 | Example of production 8 |
| Time of addition | continuously after polymerization | continuously after polymerization | after re-dispersion | after re-dispersion | after re-dispersion | after re-dispersion | after re-dispersion |
| Metal-containing organic compound (M compound) | zirconium tetrakis (acetyl acetonate) | diisopropoxy titanium bis (triethanol aminate) | diisopropoxy titanium bis (triethanol aminate) | titanium diisopropoxy bis (ethyl acetate) | triisopropoxyoxy vanadium | diisopropoxy titanium bis (triethanol aminate) | ZB-126 |
| Concentration (%) | 99% | 80% | 80% | 95% | 50% | 80% | 30% |
| Amount added (g) | 15 | 10 | 15 | 35 | 40 | 10 | 25 |
| M compound/dispersion mixture (%) | 1.24% | 0.67% | 0.99% | 2.69% | 1.61% | 0.66% | 0.61% |
| Molar ratio of M compound | 0.017 | 0.009 | 0.013 | 0.034 | 0.031 | 0.009 | 0.015 |
| Particle size (D50) μm | 38 | 38 | 38 | 25 | 34 | 38 | 32 |
| Moisture content (%) | 2.6 | 2.6 | 2.6 | 2.1 | 2.8 | 2.6 | 2.1 |
| Retention ratio of a blowing agent (%) | 18.4 | 18.4 | 18.4 | 19.2 | 18.7 | 18.4 | 17.9 |
| Sum of moisture content and retention ratio of a blowing agent (%) | 21.0 | 21.0 | 21.0 | 21.3 | 21.5 | 21.0 | 20.0 |
| True specific gravity (g/ml) | 1.05 | 1.01 | 1.03 | 1.06 | 1.06 | 1.04 | 1.04 |
| Ts1 (deg. C.) | 195 | 205 | 200 | 206 | 208 | 204 | 246 |
| Tmax1 (deg. C.) | 250 | 262 | 264 | 274 | 281 | 262 | 278 |
| Maximum expansion ratio (times) | 85 | 90 | 87 | 57 | 42 | 68 | 68 |
| Amount of Group 3-12 metal (%) | 0.60 | 0.16 | 0.24 | 0.75 | 0.72 | 0.18 | 0.62 |
| Amount of Group 12 metal (%) | UD | UD | UD | UD | UD | UD | UD |
| Ratio of DMF-insoluble matter (%) | 89 | 95 | 97 | 95 | 96 | 95 | 92 |
| $Ts_2$ (deg. C.) | 192 | 201 | 200 | 202 | 207 | 207 | 242 |
| $Tmax_2$ (deg. C.) | 231 | 255 | 261 | 268 | 272 | 250 | 263 |
| ΔTs | 1.5% | 2.0% | 0.0% | 1.9% | 0.5% | −1.5% | 1.6% |
| ΔTmax | 7.6% | 2.7% | 1.1% | 2.2% | 3.2% | 4.6% | 5.4% |
| δT (deg. C.) | 55 | 56 | 59 | 70 | 60 | 46 | 40 |
| Th (deg. C.) | 223 | 234 | 232 | 240 | 245 | 233 | 262 |
| $LW_5$ (wt %) | 12.4 | 12.6 | 11.7 | 12.4 | 11.8 | 11.9 | 10.2 |
| $LW_{30}$ (wt %) | 17.3 | 16.9 | 16.3 | 16.8 | 15.9 | 15.6 | 14.3 |

TABLE 2-continued

| | | | | | | | |
|---|---|---|---|---|---|---|---|
| Weight loss coefficient | 0.27 | 0.23 | 0.25 | 0.23 | 0.22 | 0.20 | 0.23 |
| Weight loss ratio in 30-minute heating (%) | 82.4 | 80.5 | 77.6 | 78.9 | 74.0 | 74.3 | 71.5 |

TABLE 3

| | Comparative example 1 Comparative microsphere (1) | Comparative example 2 Comparative microsphere (2) | Comparative example 3 Comparative microsphere (3) | Comparative example 4 Comparative microsphere (4) | Comparative example 5 Comparative microsphere (5) | Comparative example 6 Comparative microsphere (6) |
|---|---|---|---|---|---|---|
| Base-material microsphere | Example of production 1 | Example of production 2 | Example of production 3 | Example of production 3 | Example of production 4 | Example of production 4 |
| Time of addition | before polymerization | before polymerization | before polymerization | continuously after polymerization | before polymerization | continuously after polymerization |
| Metal compound: amount | diisopropoxy titanium bis (triethanol aminate): 55 g | $AlCl_3 \cdot 6H_2O$: 20 g NaOH: 4.2 g | $ZnCl_2$: 12 g NaOH: 3 g | $ZnCl_2$: 12 g NaOH: 3 g | $TiCl_4$ solution: 20 g NaOH: 2.2 g | $TiCl_4$ solution: 20 g NaOH: 2.2 g |
| Concentration (%) | 80% | 100% | 100% | 100% | 100% | 100% |
| Metal compound/ dispersion mixture (%) | 3.45% | 1.99% | 1.24% | 1.24% | 2.01% | 2.01% |
| Molar ratio of metal compound | 0.126 | 0.180 | 0.104 | 0.104 | 0.087 | 0.087 |
| Particle size (D50) μm | solidified | 25 | 26 | 26 | 38 | 25 |
| Moisture content (%) | | 2.2 | 2.3 | 2.3 | 2.6 | 2.1 |
| Retention ratio of a blowing agent (%) | | 17.6 | 20.4 | 20.4 | 18.4 | 19.2 |
| Sum of moisture content and retention ratio of a blowing agent (%) | | 19.8 | 22.7 | 22.7 | 21.0 | 21.3 |
| Ts1 (deg. C.) | | 195 | 204 | 204 | not expanded | 201 |
| Tmax1 (deg. C.) | | 232 | 242 | 234 | | 237 |
| Maximum expansion ratio | | 28 | 25 | 42 | | 42 |
| Amount of Group 3-12 metal (%) | | UD | UD | UD | | 0.58 |
| Amount of Group 12 metal (%) | | UD | 0.83 | 0.94 | | UD |
| Ratio of DMF-insoluble matter (%) | | 80 | 87 | 75 | | 74 |
| Ts2 (deg. C.) | | 178 | 203 | 203 | | 184 |
| Tmax2 (deg. C.) | | 207 | 235 | 207 | | 209 |
| ΔTs | | 8.7% | 0.5% | 0.5% | | 8.5% |
| ΔTmax | | 10.8% | 2.9% | 11.5% | | 11.8% |
| Th (deg. C.) | | 214 | 223 | 219 | | 219 |
| $LW_5$ (wt %) | | 8.9 | 9.8 | 10.5 | | 9.8 |
| $LW_{30}$ (wt %) | | 19.6 | 21.9 | 22.5 | | 21.3 |
| Weight loss coefficient | | 0.61 | 0.59 | 0.59 | | 0.60 |
| Weight loss ratio in 30-minute heating (%) | | 99.0 | 96.5 | 99.1 | | 100 |

TABLE 4

| | Example 15 | Example 16 | Example 17 Microsphere (17) | Example 18 Microsphere (18) |
|---|---|---|---|---|
| Base-material microsphere | Example of production 4 | Example of production 4 | Example of production 9 | Example of production 10 |

TABLE 4-continued

|  | Example 15 | Example 16 | Example 17 Microsphere (17) | Example 18 Microsphere (18) |
|---|---|---|---|---|
| Time of addition | after drying | at fluidized bed | continuously after polymerization | after re-dispersion |
| Metal-containing organic compound (M compound) | dioctyloxytitanium bis(octylene glycolate) | titanium butoxy dimer | diisopropoxytitanium bis(triethanol aminate) | diisopropoxytitanium bis(triethanol aminate) |
| Concentration (%) | 67% | 50% | 80% | 80% |
| Amount added (g) | 50 | 47.5 | 15 | 15 |
| M compound/ dispersion mixture (%) | 7.44% | 5.31% | 1.05% | 0.99% |
| Molar ratio of M compound | 0.038 | 0.044 | 0.013 | 0.013 |
| Particle size (D50) μm | 38 | 38 | 36 | 34 |
| Moisture content (%) | 2.6 | 2.6 | 2.2 | 2.5 |
| Retention ratio of a blowing agent (%) | 18.4 | 18.4 | 18.1 | 18.4 |
| Ts1 (deg. C.) | 205 | 207 | 260 | 232 |
| Tmax1 (deg. C.) | 262 | 265 | 275 | 271 |
| Maximum expansion ratio (times) | 79 | 65 | 54 | 82 |
| Amount of Group 3-12 metal (%) | 0.69 | 0.84 | 0.24 | 0.23 |
| Amount of Group 12 metal (%) | UD | UD | UD | UD |
| Ratio of DMF-insoluble matter (%) | 95 | 97 | 94 | 95 |
| Ts2 (deg. C.) | 204 | 204 | 258 | 230 |
| Tmax2 (deg. C.) | 250 | 257 | 271 | 264 |
| ΔTs | 0.5% | 1.4% | 0.8% | 0.9% |
| ΔTmax | 4.6% | 3.0% | 1.5% | 2.6% |

In Tables 2 to 4, the contents of the cells belonging to the horizontal row titled with "Base-material microsphere" and to the vertical columns titled with "Examples 1 to 9 and 17 and Comparative Examples 4 and 6" specify the Examples of production in which the liquids containing base-material microspheres were prepared; the contents of the cells belonging to the same horizontal row and to the vertical columns titled with "Examples 10 to 14 and 18" specify the Examples of production in which the base-material microspheres were produced; and the contents in the cells belonging to the same horizontal row and to the vertical columns titled with "Comparative examples 1 to 3 and 5" specify the Examples of production in which the liquids for the polymerization were employed.

In Tables 2 to 4, the description of "continuously after polymerization" in the cells belonging to the horizontal row titled with "Time of addition" means that a metal-containing organic compound (a metal compound in each of Comparative examples 4 and 6) was added to the liquids after the polymerization in the Examples of production. The description of "after re-dispersion" in the cells belonging to the same horizontal row means that base-material microspheres produced in the polymerization in the Examples of production are separated and re-dispersed in deionized water and a metal-containing organic compound was added to the dispersion. The description of "before polymerization" in the cells belonging to the same horizontal row means that a metal compound was added to a liquid mixture prepared by mixing an aqueous dispersion medium and oily mixture in the Examples of production. The description of "after drying" means that a metal-containing compound was added to base-material microspheres after drying. The description of "at fluidized bed" means that a metal-containing compound was added to dried base-material microspheres at fluidized bed.

[Workable Temperature Range of Heat-Expandable Microspheres]

In a box used for the determination of the expansion ratio of microspheres, 1.0 g of the microspheres (5) produced in Example 5 was weighed and uniformly placed. Eight boxes each containing 1.0 g of the microspheres (5) were prepared and heated in a Geer oven at different temperature levels shown in Table 5 for 4 minutes. The true specific gravity and expansion ratio of the resultant hollow particulates (thermally expanded heat-expandable microsphere) were determined.

The base-material microspheres (3) produced in Example of production 3 were thermally expanded in the same manner as mentioned above, and the true specific gravity and expansion ratio of the resultant hollow particulates were determined.

The only difference between the microspheres (5) and base-material microspheres (3) is their surface treatment. The base-material microspheres (3) have similar properties to the microspheres of the Comparative examples from the viewpoint of the present invention. The results from the determination are shown in Table 5.

TABLE 5

|  |  | Microsphere (5) | Base-material microspheres (3) |
|---|---|---|---|
| True specific gravity after heating for 4 minutes (g/ml) | 220 deg. C. | 0.032 | 0.045 |
|  | 230 deg. C. | 0.023 | 0.030 |
|  | 240 deg. C. | 0.016 | 0.016 |
|  | 250 deg. C. | 0.009 | 0.027 |
|  | 260 deg. C. | 0.008 | 0.038 |

TABLE 5-continued

|  |  | Microsphere (5) | Base-material microspheres (3) |
|---|---|---|---|
|  | 270 deg. C. | 0.010 | 0.048 |
|  | 280 deg. C. | 0.013 | 0.069 |
|  | 290 deg. C. | 0.019 | 0.100 |
| Expansion ratio (times) | 220 deg. C. | 33 | 22 |
|  | 230 deg. C. | 45 | 35 |
|  | 240 deg. C. | 65 | 63 |
|  | 250 deg. C. | 112 | 44 |
|  | 260 deg. C. | 128 | 27 |
|  | 270 deg. C. | 99 | 21 |
|  | 280 deg. C. | 80 | 15 |
|  | 290 deg. C. | 55 | 10 |

Figure 3:
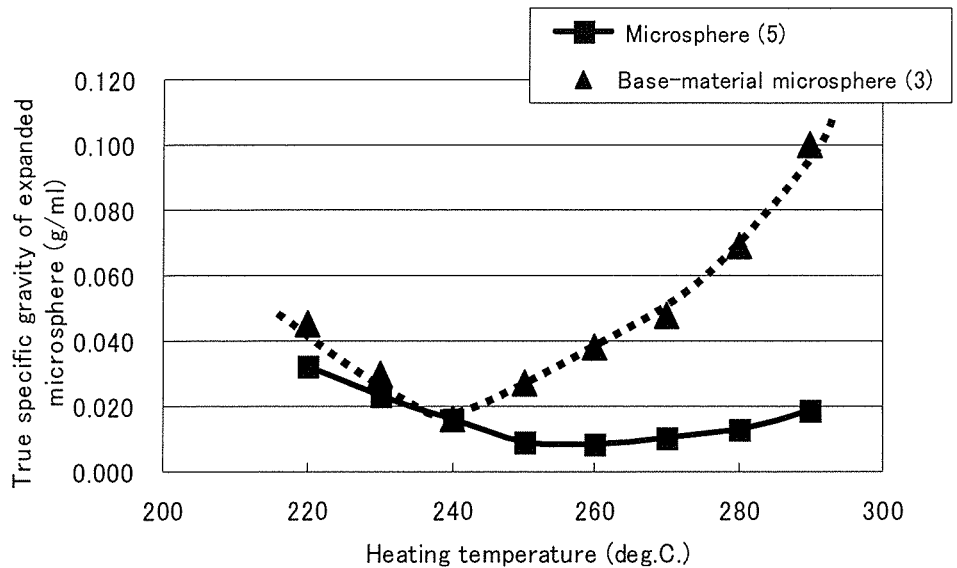
[FIG. 3] is a graph representing the temperature for heating the surface-treated microspheres (5) and the base-material microspheres without surface treatment (3), and their true specific gravity determined

FIG. 3 is a graph showing the result from the determination of the true specific gravity of the surface-treated microspheres (5) and the base-material microspheres (3) without surface treatment at varied heating temperatures. The graph shows that the microspheres (5) resulted in lower true specific gravity than the base-material microspheres (3) in almost all of the regions of the heating temperature. The true specific gravity of the base-material microspheres (3) increased with the increase of heating temperature in the high temperature region above 240 deg. C. due to the migration of the blowing agent out of the microspheres, while the true specific gravity of the microspheres (5) remained low with slight variation even in the high temperature region above 240 deg. C.

Figure 4:
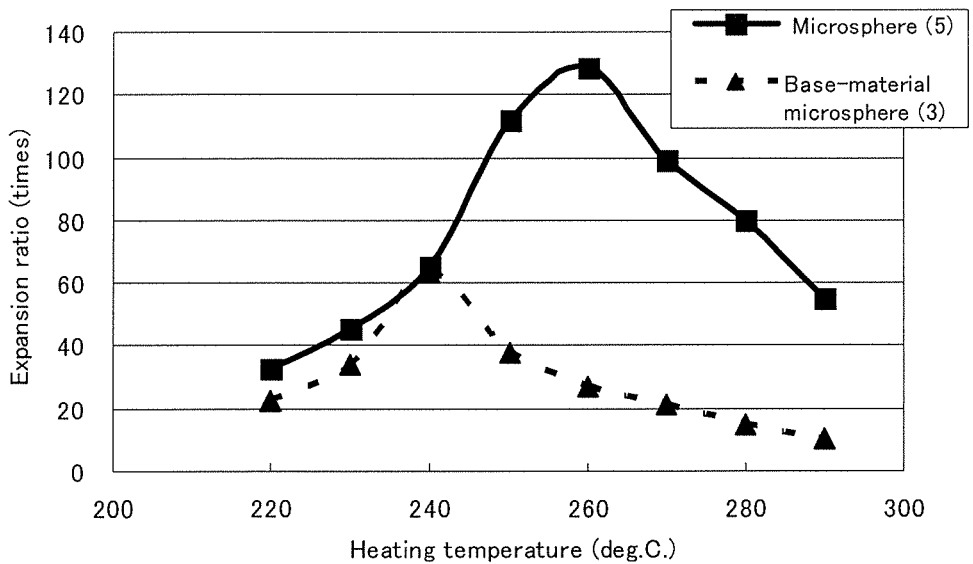
[FIG. 4] is a graph representing the temperature for heating the microspheres (5) and the base-material microspheres (3), and their expansion ratio

FIG. 4 is a graph showing the result from the determination of the expansion ratio of the microspheres (5) and base-material microspheres (3) at varied heating temperature. The graph shows that the surface treatment contributes to stable expansion performance of microspheres in high temperature region.

Figure 5:
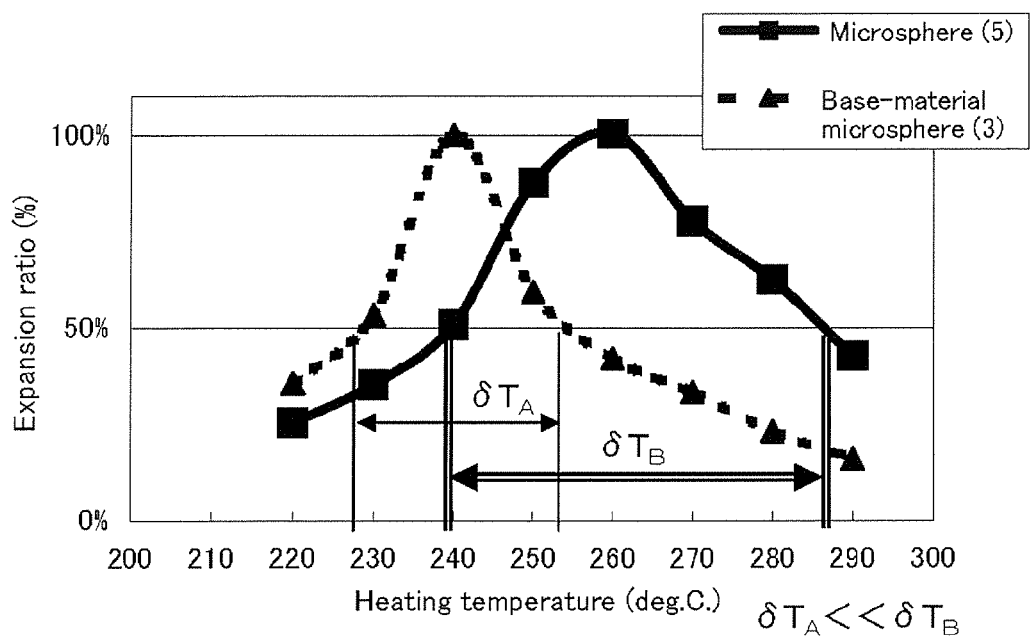
[FIG. 5] is a graph representing the relation between the heating temperature and expansion ratio of the microspheres (5) and the base-material microspheres (3), which have been heated and expanded
Figure 6:
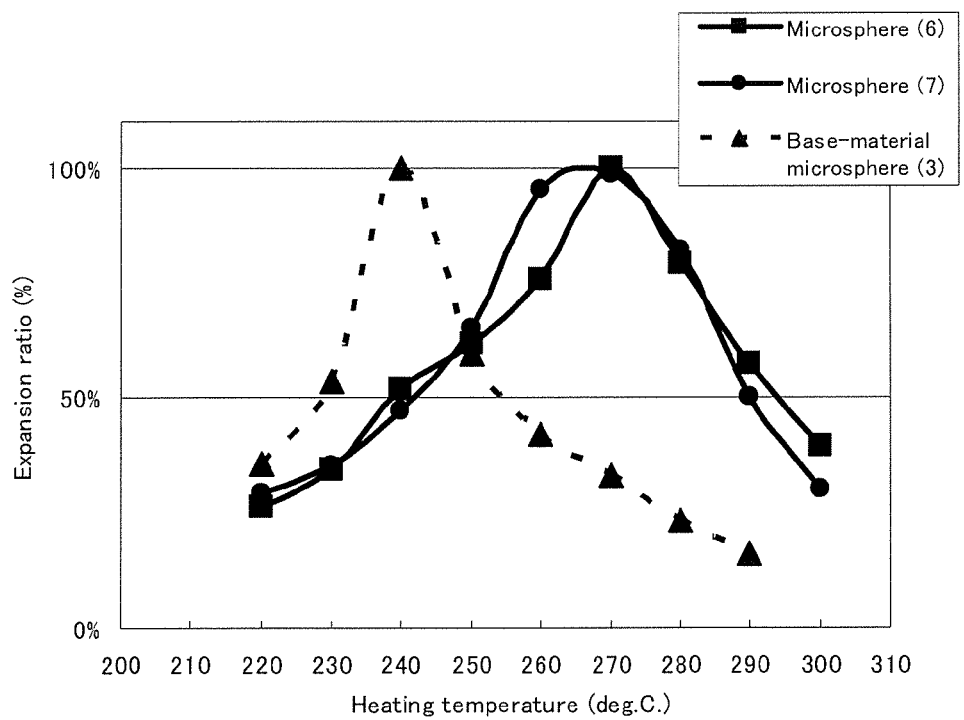
[FIG. 6] is a graph representing the relation between the heating temperature and expansion ratio of the microspheres (6) and (7) and the base-material microspheres (3), which have been heated and expanded
Figure 7:
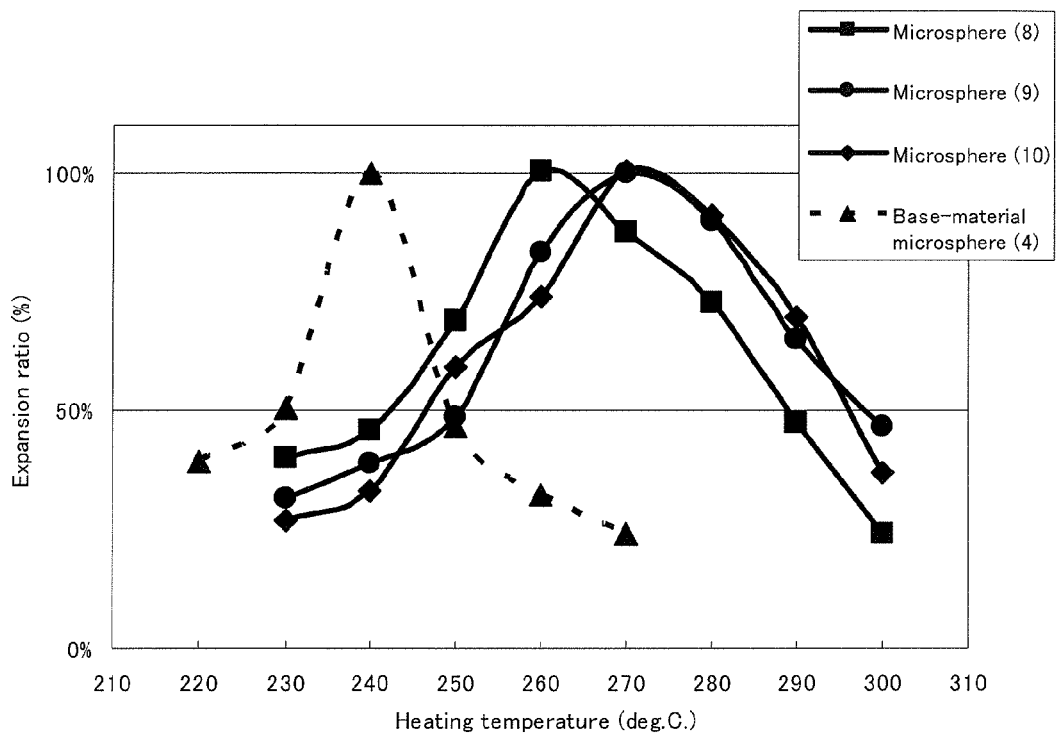
[FIG. 7] is a graph representing the relation between the heating temperature and expansion ratio of the microspheres (8) to (10) and the base-material microspheres (4), which have been heated and expanded
Figure 8:
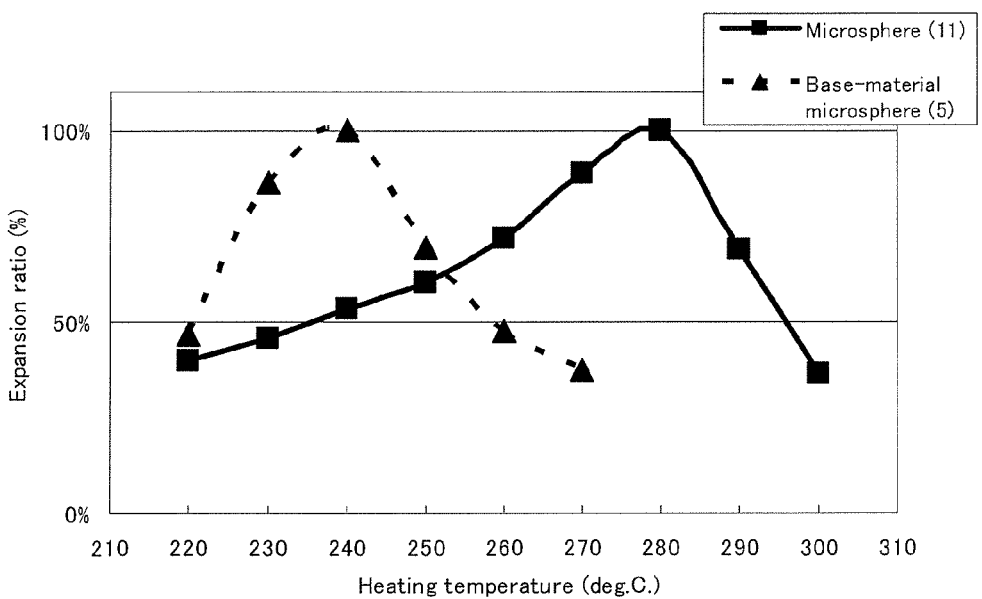
[FIG. 8] is a graph representing the relation between the heating temperature and expansion ratio of the microspheres (11) and the base-material microspheres (5), which have been heated and expanded
Figure 9:
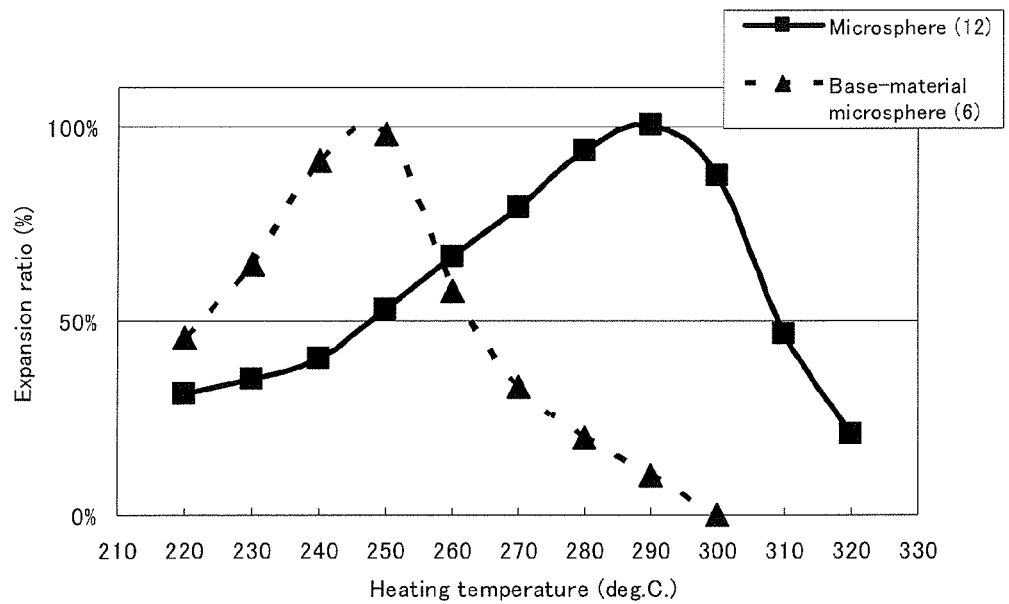
[FIG. 9] is a graph representing the relation between the heating temperature and expansion ratio of the microspheres (12) and the base-material microspheres (6), which have been heated and expanded
Figure 10:
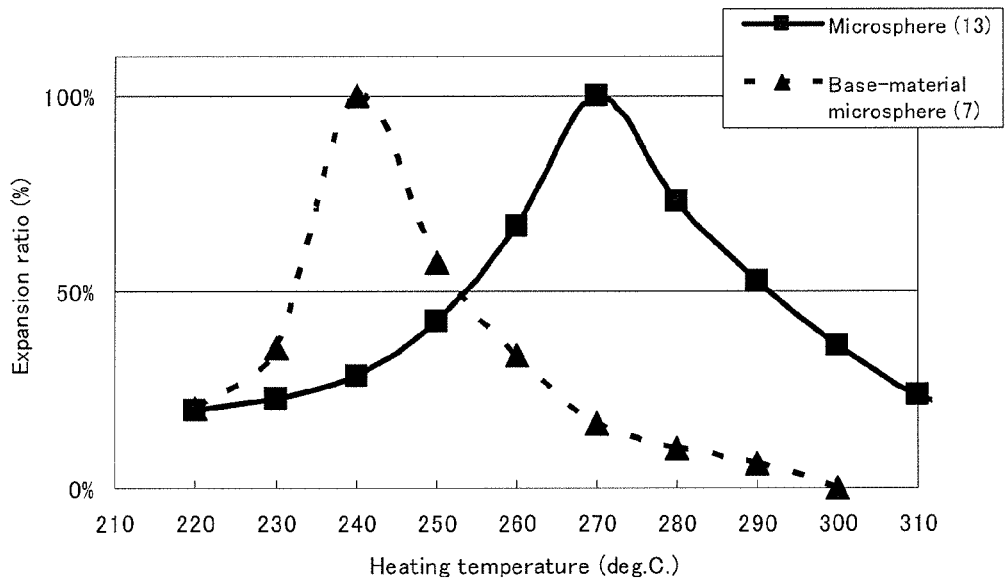
[FIG. 10] is a graph representing the relation between the heating temperature and expansion ratio of the microspheres (13) and the base-material microspheres (7), which have been heated and expanded
Figure 11:
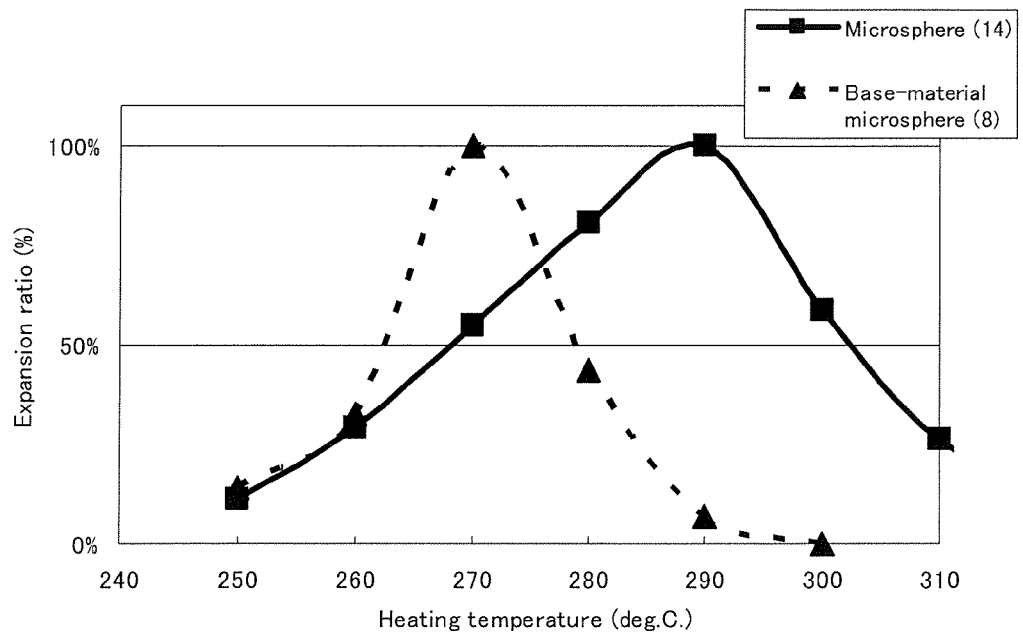
[FIG. 11] is a graph representing the relation between the heating temperature and expansion ratio of the microspheres (14) and the base-material microspheres (8), which have been heated and expanded

FIG. 5 is a graph showing the relation between the heating temperature for the microspheres (5) and base-material microspheres (3) and their expansion ratio. The graph was drawn in the same manner as that in FIG. 2 mentioned above. The δT of the base-material microspheres (3), $\delta T_A$, and the δT of the microspheres (5), $\delta T_B$, were respectively read to be 26 deg. C. and 48 deg. C. in FIG. 5. This proves that the working temperature range of the microspheres (5) is much broader than that of the base-material microspheres (3).

The microspheres and base-material microspheres produced in the Examples described above were heated and expanded, and the relation between the heating temperature and their expansion ratio was plotted and drawn into the graphs of FIGS. 6 to 11 in the same manner as that for FIG. 5. The δTs read in each of the graphs are shown in Tables 1 and 2. The results show that the heat-expandable microspheres produced in the Examples have large δTs, which represents broad working temperature ranges of the microspheres.

EXAMPLE A1

Wet heat-expandable microspheres were prepared by uniformly mixing 500 g of the heat-expandable microspheres produced in Example 9 and 25 g of a process oil (Kyoseki Process Oil P-200, produced by Nikkou Kyoseki Co., Ltd.).

Then 52.5 g of the wet heat-expandable microspheres and 2447.5 g of a polystyrene (AGI02, having a density of 1.04 g/ml and MFR (melt flow rate) of 15 g/10 min at 200 deg. C. with 5 kgf, produced by PS Japan Corporation) were uniformly mixed. The mixture was filled in the cylinders of a Labo Plastomill (ME-25, two-shaft extruder, produced by Toyo Seiki Seisaku-Sho Co., Ltd.) equipped with a T-die (with 1.8-mm wide lip) where the temperature of the cylinders C1, C2 and C3 and the T-die was set at 230 deg. C. and the rotational speed of the screw was set at 25 rpm to hold the mixture in the cylinders for 12 minutes. Then the screw was stopped for 5 minutes, 15 minutes, and 30 minutes respectively, and after each stop the mixture was extruded with the screw rotating at 25 rpm to be formed into an expanded sheet. The specific gravities of the expanded sheets formed after each screw-stop period are shown in Table 6.

The result in Table 6 shows that the specific gravities of the expanded sheets are constant not being influenced by the periods of the screw stop at high temperature, and it proves the long working life of the microspheres. A composition containing such microspheres can be constantly manufactured into expanded products without the influence by the length of holding time in extrusion molding.

COMPARATIVE EXAMPLE A1

Expanded sheets were manufactured in the same manner as that in Example A1 except that the heat-expandable microspheres were replaced with the heat-expandable microspheres produced in Example of production 4. The properties of the sheets are shown in Table 6.

Figure 12:
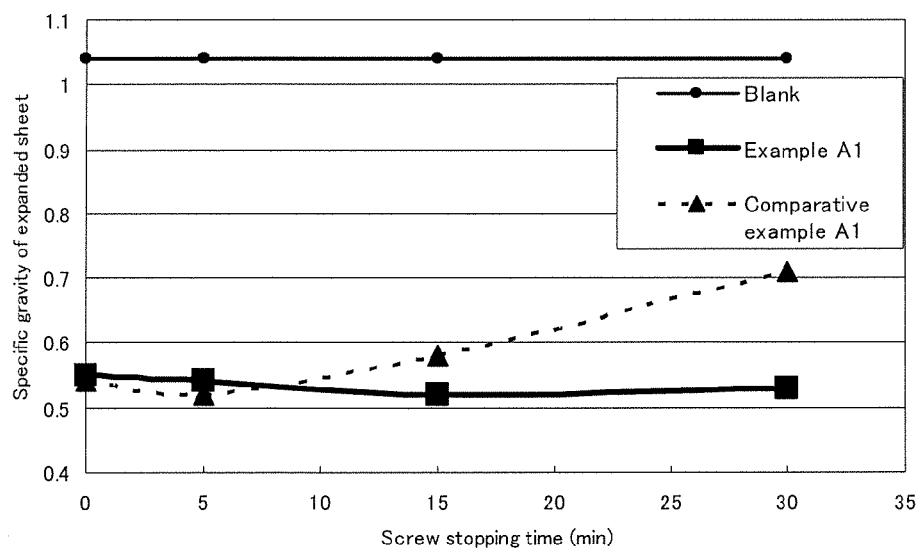
[FIG. 12] is a graph comparing the working lives of the microspheres of Example A1 and Comparative Example A1

FIG. 12 shows the comparison between the working lives of the microspheres of Example A1 and Comparative example A1. The heat-expandable microspheres of Example A1 exhibit long working life indicated by the specific gravity of the expanded sheet which do not change with the increase in the screw stopping time from 0 to 30 minutes. On the contrary, the heat-expandable microspheres of Comparative example A1 exhibit short working life indicated by the remarkable decrease in their expansion performance and the gradual increase in the specific gravity of expanded sheets with the increase in the screw stopping time from 0 to 30 minutes.

TABLE 6

|  |  | Heat-expandable microspheres used | |
|---|---|---|---|
| After holding the mixture in the cylinder | Screw stopping time | Example A1 Example 9 | Comparative example A1 Example of production 4 |
| Specific gravity of expanded sheets | 0 min | 0.55 | 0.54 |
|  | 5 min | 0.54 | 0.52 |
|  | 15 min | 0.52 | 0.61 |
|  | 30 min | 0.53 | 0.71 |

[Working Life of a Heat-Expandable Microspheres]

Figure 14:
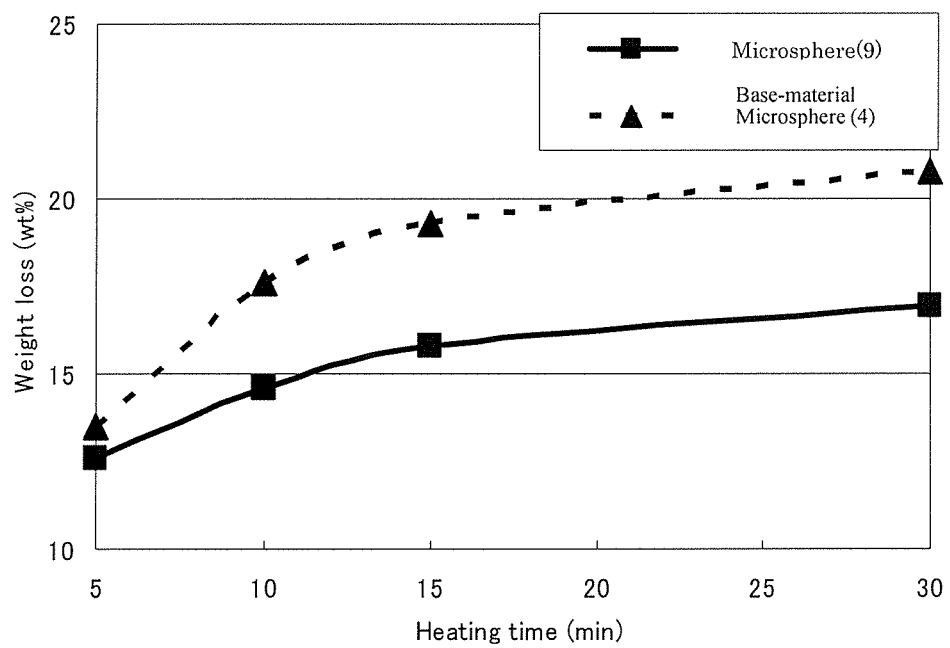
[FIG. 14] is a graph representing the relation between the heating time and weight loss of the microspheres (9) and the base-material microspheres (4), which have been heated and expanded at 234 deg. C.

FIG. 14 is a graph showing the relation between the heating time and weight loss of the microspheres (9) used in Example A1 and the heat-expandable microspheres used in Comparative example A1 (the base-material microspheres (4) for producing the microspheres (9)). Those microspheres were heated at 234 deg. C., which is the "Th" of the microspheres (9). The graph was drawn in the same manner as that for the curve chart in FIG. 13.

FIG. 14 provides the data for comparing the lengths of working lives of those microspheres with and without the surface treatment. Although the microspheres (9) and base-material microspheres (4) have the same retention ratio of the blowing agent, the weight loss of the base-material microspheres (4) reached to 17.5 weight percent after being heated for only 10 minutes while the weight loss of the microspheres (9) was about 17 weight percent after being heated for 30 minutes. In other words, surface-treated heat-expandable microspheres result in smaller weight loss and retain much longer working life than microspheres without surface treatment, even after they are heated at high temperature for a long time.

The weight loss coefficient and weight loss ratio in 30-minute heating of the surface-treated microspheres and base-material microspheres mentioned above were calculated and shown in Tables 1 to 3. As mentioned above, the heat-expandable microspheres of the Examples have a weight loss coefficient ranging from 0 to 0.45 and a weight loss ratio in 30-minute heating ranging from 5 to 95 percent, and the data prove that those microspheres have a long working life.

EXAMPLE A2

In a box used for the determination of the expansion ratio of microspheres, 1.0 g of the heat-expandable microspheres of Example 15 was weighed and placed. The box was heated in a Geer oven at 240 deg. C. for 4 minutes. The resultant hollow particulates had a true specific gravity of 0.025 g/ml.

Then 0.5 g of the hollow particulates was immersed in 30 g of acetonitrile and kept for 60 minutes at an ambient temperature of 25 deg. C. Then the hollow particulates were taken out, washed in normal hexane and dried, and the true specific gravity of the hollow particulates was determined to be 0.026 g/ml. The true specific gravity of the hollow particulates hardly changed after the immersion in acetonitrile and it proves that the hollow particulates have excellent solvent resistance as well as the heat-expandable microspheres of Example 15.

EXAMPLE B1

(Preparation of a Master-batch Pellet)

A resin mixture was prepared by uniformly mixing 500 g of the heat-expandable microspheres produced in Example 17 and 25 g of a process oil (Kyoseki Process Oil P-200, produced by Nikkou Kyoseki Co., Ltd.), adding 475 g of polyethylene pellet (DNDV0405R, produced by Dow Chemical Japan) to the mixture, and uniformly mixing the mixture.

Then the resin mixture was thrown into a Labo Plastomill (ME-25, two-shaft extruder, produced by Toyo Seiki Seisaku-Sho Co., Ltd.) equipped with a strand die (with 1.5-mm hole diameter) through the raw-material hopper of the Labo Plastomill. The mixture was knead in the Labo Plastomill, where the temperature of the cylinders C1 and C3 and the strand die was set at 150 deg. C., the temperature of the cylinder C2 was set at 160 deg. C., and the screw speed was set at 40 rpm. Then the mixture was extruded and processed with a pelletizer into a master-batch pellet B1 (containing 50 weight percent of the heat-expandable microspheres).

(Injection Molding)

A pellet mixture was prepared by mixing 6 parts by weight of the master-batch pellet B1 and 100 parts by weight of polycarbonate resin (TARFLON® R2200, having a specific gravity of 1.2, produced by Idemitsu Kosan Co., Ltd.). The pellet mixture was fed to a screw-type preplasticating injection molder (TUPARL TR80S2A, with 80-ton clamping capacity, supplied by Sodick Co., Ltd.), melted, kneaded, and injection-molded into a plate. The injection-molding was carried out with a plasticizer temperature of 260 deg. C., injection speed of 70 mm/sec, mold temperature of 80 deg. C. and injection temperature ranging from 260 to 320 deg. C. The expansion performance of the pellet mixture was evaluated by determining the specific gravity of the resultant molded products. The specific gravities of the molded products produced at each molding temperature are shown in Table 7.

EXAMPLE B2, and COMPARATIVE EXAMPLES B1 and B2

Molded products were produced by injection molding in the same manner as that in Example B1 except that the heat-expandable microspheres were replaced with those shown in Table 7. The specific gravities of the molded products produced at each molding temperature are shown in Table 7.

TABLE 7

| | | Example B1 | Example B2 | Comparative example B1 | Comparative example B2 |
|---|---|---|---|---|---|
| | | Heat-expandable microspheres used | | | |
| | Extrusion temperature | Microsphere (17) | Microsphere (18) | Base-material microspheres (9) | Base-material microspheres (10) |
| Specific gravity of molded products | 260 deg. C. | 1.20 | 0.95 | 1.19 | 1.02 |
| | 280 deg. C. | 0.98 | 0.86 | 1.08 | 1.11 |
| | 300 deg. C. | 0.85 | 0.78 | 1.18 | 1.16 |
| | 320 deg. C. | 0.89 | 0.91 | 1.20 | 1.20 |

Figure 15:
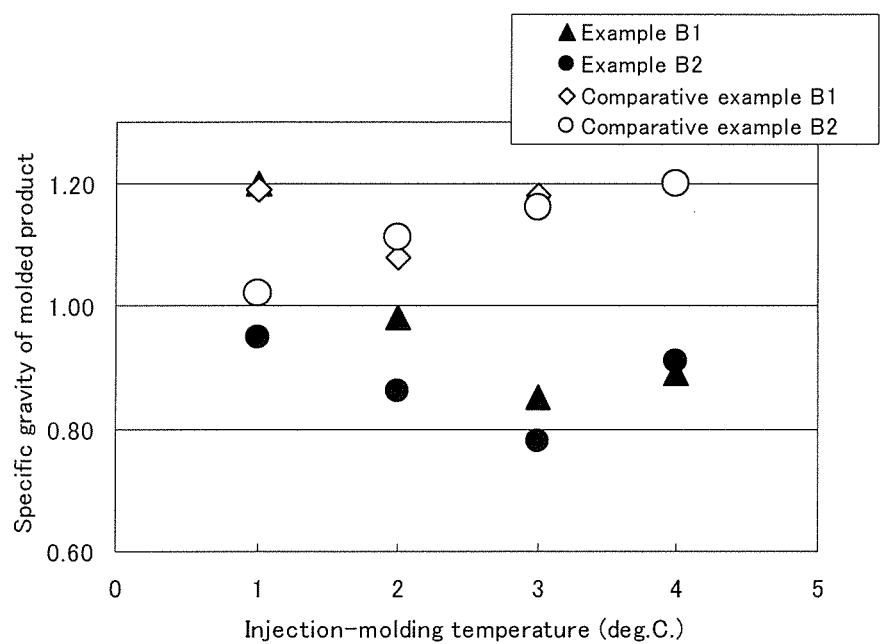
[FIG. 15] is a graph comparing the specific gravities of the formed products produced in Examples B1 and B2, and in Comparative Examples B1 and B2

FIG. 15 shows the plot of the specific gravity data of the products produced in injection molding summarized in Table 7, in which the expansion performances of the pellet mixtures of Examples B1 and B2 are compared to that of the pellet mixtures of Comparative examples B1 and B2.

The plot in FIG. 15 clearly shows the difference in expansion performance depending on the surface treatment.

In Examples B1 and B2, the surface treatment on the base-material microspheres including isohexadecane as a blowing agent achieved the increase in the expansion-initiating temperature and extension in the working temperature range of the base-material microspheres. On the contrary, the microspheres without surface treatment in Comparative examples B1 and B2 resulted in low retention of the encapsulated blowing agent, low expansion ratio and narrow working temperature range of the microspheres, though their expansion-initiating temperature was increased owing to isohexadecane employed for the blowing agent.

In Tables 1 to 7 described above, the abbreviations in Table 8 are employed.

TABLE 8

| Abbreviation | Meaning |
| --- | --- |
| UD | less than a detectable limit |
| PVP | polyvinyl pyrolidone |
| Adipic acid-DEA condensate | a condensate of adipic acid and diethanolamine (acid value = 85.3 mgKOH/g) |
| EDTA | ethylene diaminetetraacetic acid tetrasodium salt |
| AN | acrylonitrile |
| MAN | methacrylonitrile |
| MAA | methacrylic acid |
| 1.9 ND-A | 1,9-nonanediol diacrylate |
| TMP | trimethylolpropane trimethacrylate |
| BEPG-A | 2-butyl-2-ethyl-1,3-propanediol diacrylate |
| SBP | di-sec-butyl peroxydicarbonate (concentration: 50 wt %) |
| isooctane | 2,2,4-trimethyl pentane |
| isododecane | 2,2,4,6,6-pentamethyl heptane |
| isohexadecane | 2,2,4,4,6,6,8-heptamethyl nonane |
| ZB-126 | ORGATIX ZB-126 (produced by Matsumoto Seiyaku Kogyo Co., Ltd.) |

INDUSTRIAL APPLICABILITY

The heat-expandable microspheres of the present invention have excellent heat resistance and are employable in a broad range of molding processes with high-melting-point resins. The heat-expandable microspheres of the present invention also have excellent solvent resistance and exhibit stable performance in paints, sealants and adhesives for a long time.

REFERENCE NUMERALS

1 Shell including a thermoplastic resin
2 Blowing agent

What is claimed is:
1. Heat-expandable microspheres, each comprising
a shell of a thermoplastic resin and a thermally vaporizable blowing agent being encapsulated therein,
wherein the thermoplastic resin comprises a copolymer produced by polymerizing a polymerizable component comprising a carboxyl-group-containing monomer, with an amount of N,N-dimethylformamide-insoluble matter contained in the heat-expandable microspheres being at least 75 weight percent, and
the heat-expandable microspheres include treated surfaces having been treated with an organic compound that is soluble in water, the organic compound containing a metal M, the metal M being selected from a group of metals consisting of the Groups from 3 to 11 in the Periodic Table with the metal M of the organic compound forming cross-linked bonding to the surface of the heat-expandable microspheres, and prior to treating of the surfaces of the heat-expandable microspheres the metal-containing organic compound is a metal-amino acid compound and/or a compound having at least one bond represented by the following chemical formula (1),

$$M-O-C \qquad (1)$$

(where "M" is an atom of a metal of the Groups from 3 to 11 in the Periodic Table; and the carbon atom, "C", bonds to the oxygen atom, "O", and also bonds only to a hydrogen atom and/or a carbon atom except the oxygen atom, "O"), and
the heat-expandable microspheres exhibit a first expansion-initiation at a first expansion-initiating temperature $Ts1$ in degrees C. and exhibit a greatest expansion rate at a maximum expansion temperature $Tmax1$ in degrees C., and
the heat-expandable microspheres exhibit a second expansion-initiation at a second expansion-initiating temperature $Ts2$ in degrees C. and exhibit a second greatest expansion rate at a maximum expansion temperature $Tmax2$ in degrees C. as determined after dispersing 5 parts by weight of the microspheres in 100 part by weight of deionized water, and then filtering and drying, with a range of variation $\Delta Ts$ between the first expansion-initiating temperature $Ts1$ and the second expansion-initiating temperature $Ts2$ being less than or equal to 10 percent of the expansion initiating temperature $Ts1$, and with a range of variation $\Delta Tmax$ of the maximum expansion temperatures $Tmax1$ and $Tmax2$ of the heat-expandable microspheres being less than or equal to 10 percent of the maximum expansion temperature $Tmax1$, wherein the amount of the carboxyl-group-containing monomer is in the range of 30 to 90 percent and the polymerizable component further comprises a nitrile monomer.

2. Heat-expandable microspheres according to claim 1, wherein the amount of the metal M ranges from 0.05 to 15 weight percent of the heat-expandable microspheres.

3. Heat-expandable microspheres according to claim 1, wherein the metal belongs to the Groups 4 and 5 in the Periodic Table.

4. Heat-expandable microspheres according to claim 1, wherein the blowing agent comprises a hydrocarbon having a boiling point at least −20 deg. C. and lower than 170 deg. C. and a hydrocarbon having a boiling point ranging from 170 deg. C. to 360 deg. C.

5. Heat-expandable microspheres according to claim 1, wherein the maximum expansion temperature $Tmax1$ is at least 240 deg. C. and—maximum expansion ratio of the heat-expandable microspheres is at least 30 times.

6. Heat-expandable microspheres according to claim 1, being wet with a liquid.

7. Hollow particulates produced by heating and expanding the heat-expandable microspheres of claim 1 and/or the heat-expandable microspheres surfaces of base-material microspheres being treated with an organic compound containing the metal, the metal being selected from the group of metals consisting of the Groups from 3 to 11 in the Periodic Table, wherein the base-material microspheres comprise a shell of a thermoplastic resin produced by polymerizing a polymerizable component comprising a carboxyl-group-containing monomer and a thermally vaporizable blowing agent being encapsulated therein.

8. A composition containing at least one particulate material selected from the group consisting of the heat-expandable microspheres of claim 1, the heat-expandable microspheres including surfaces of base-material microspheres treated with an organic compound containing the metal, the metal being selected from the group of metals consisting of the Groups from 3 to 11 in the Periodic Table, wherein the base-material microspheres comprise a shell of a thermoplastic resin produced by polymerizing a polymerizable component comprising a carboxyl-group-containing monomer and a thermally vaporizable blowing agent being encapsulated therein;
and hollow particulates produced by heating and expanding the heat-expandable microspheres; and
a base component.

9. A formed product produced by forming the composition of claim 8.

10. Heat-expandable microspheres according to claim 1, wherein
the cross-linking structure includes $M(-OCO-)_n$, where n is an integer of 2 to 5, bonded to the surface of the heat-expandable microspheres.

11. A process for producing heat-expandable microspheres comprising a step of:
providing base-material microspheres that include a shell of a thermoplastic resin and a thermally vaporizable blowing agent being encapsulated therein, the thermoplastic resin includes a copolymer produced by polymerizing a polymerizable component comprising a carboxyl-group-containing monomer,
treating the surface of the base-material microspheres with an organic compound that is soluble in water, the organic compound containing a metal M, where the metal M is selected from a group of metals consisting of the Groups from 3 to 11 in the Periodic Table, the treating of the surface resulting in cross-linking of the metal M to the surface of the microspheres creating a treated surface, and prior to treating of the surfaces of the heat-expandable microspheres the metal-containing organic compound is a metal-amino acid compound and/or a compound having at least one bond represented by the following chemical formula (1),

M-O—C     (1)

(where "M" is an atom of a metal of the Groups from 3 to 11 in the Periodic Table; and the carbon atom, "C", bonds to the oxygen atom, "O", and also bonds only to a hydrogen atom and/or a carbon atom except the oxygen atom, "O"),
an amount of N,N-dimethylformamide-insoluble matter contained in the resultant surface treated heat-expandable microspheres being at least 75 weight percent,
the surface treated heat-expandable microspheres exhibiting a first expansion-initiation at a first expansion-initiating temperature $Ts1$ in degrees C. and exhibiting a greatest expansion rate at a maximum expansion temperature $Tmax1$ in degrees C., and
the surface treated heat-expandable microspheres exhibiting a second expansion-initiation at a second expansion-initiating temperature $Ts2$ in degrees C. and exhibit a second greatest expansion rate at a maximum expansion temperature $Tmax2$ in degrees C. as determined after dispersing 5 parts by weight of the microspheres in 100 part by weight of deionized water, and then filtering and drying, with a range of variation $\Delta Ts$ between the first expansion-initiating temperature $Ts1$ and the second expansion-initiating temperature $Ts2$ being less than or equal to 10 percent of the expansion initiating temperature $Ts1$, and with a range of variation $\Delta Tmax$ of the maximum expansion temperatures $Tmax1$ and $Tmax2$ of the heat-expandable microspheres being less than or equal to 10 percent of the maximum expansion temperature $Tmax1$ wherein the amount of the carboxyl-group-containing monomer is in the range of 30 to 90 percent and the polymerizable component further comprises a nitrile monomer.

12. A process for producing heat-expandable microspheres according to claim 11, wherein the surface treatment is carried out by mixing the base-material microspheres and the metal-containing organic compound in an aqueous dispersion medium.

13. A process for producing heat-expandable microspheres according to claim 11, the process further comprising, prior to the surface-treatment step, a step of:
producing base-material microspheres by polymerizing the polymerizable component in an aqueous dispersion medium in which an oily mixture containing the polymerizable component and a blowing agent is dispersed;
wherein the surface treatment is carried out in the liquid after the polymerization in which the base-material microspheres are contained.

14. A process for producing heat-expandable microspheres according to claim 11, wherein the surface treatment is carried out by spraying a liquid comprising the metal-containing organic compound to the base-material microspheres.

15. A process for producing heat-expandable microspheres of claim 11, the process further comprising a step of wetting, with a liquid, the heat-expandable microspheres produced at the surface treatment step.

* * * * *